(12) United States Patent
Miura

(10) Patent No.: US 7,920,458 B2
(45) Date of Patent: *Apr. 5, 2011

(54) OPTICAL RECORDING MEDIUM, AND RECORDING AND REPRODUCING METHOD

(75) Inventor: Hiroshi Miura, Yamato (JP)

(73) Assignee: Ricoh Company, Ltd., Tokyo (JP)

( * ) Notice: Subject to any disclaimer, the term of this patent is extended or adjusted under 35 U.S.C. 154(b) by 1150 days.

This patent is subject to a terminal disclaimer.

(21) Appl. No.: 11/409,449

(22) Filed: Apr. 20, 2006

(65) Prior Publication Data

US 2006/0245342 A1    Nov. 2, 2006

(30) Foreign Application Priority Data

Apr. 27, 2005 (JP) .................................. 2005-130465
May 11, 2005 (JP) .................................. 2005-138961
Mar. 1, 2006 (JP) .................................. 2006-054695

(51) Int. Cl.
    *G11B 7/24* (2006.01)
(52) U.S. Cl. ............... 369/275.1; 369/13.04; 369/13.05; 369/13.55; 369/272.1; 369/275.3; 369/286
(58) Field of Classification Search ............... 369/13.04, 369/13.05, 272.1, 275.1
    See application file for complete search history.

(56) References Cited

U.S. PATENT DOCUMENTS

| | | | | |
|---|---|---|---|---|
| 5,976,657 | A * | 11/1999 | Min et al. ...................... | 428/64.1 |
| 7,480,924 | B2 * | 1/2009 | Hattori et al. ................. | 720/659 |
| 2001/0012265 | A1 * | 8/2001 | Nishiyama et al. ........ | 369/275.4 |
| 2004/0008597 | A1 * | 1/2004 | Tanaka et al. ............... | 369/53.25 |
| 2006/0072438 | A1 * | 4/2006 | Nishino et al. ............. | 369/275.1 |
| 2006/0104194 | A1 * | 5/2006 | Ota et al. .................... | 369/275.4 |
| 2006/0114807 | A1 * | 6/2006 | Ootera et al. ............... | 369/275.1 |
| 2008/0068970 | A1 * | 3/2008 | Hayashi et al. ........... | 369/112.01 |

FOREIGN PATENT DOCUMENTS

| | | |
|---|---|---|
| JP | 2-276036 | 11/1990 |
| JP | 4-162223 | 6/1992 |
| JP | 5-205313 | 8/1993 |
| JP | 2000-11447 | 1/2000 |
| JP | 2000-251321 | 9/2000 |
| JP | 2000-276770 | 10/2000 |
| JP | 2000-322772 | 11/2000 |
| JP | 2001-236689 | 8/2001 |
| JP | 2001-266405 | 9/2001 |
| JP | 2002-208180 | 7/2002 |
| JP | 2002-222543 | 8/2002 |
| JP | 2002-240432 | 8/2002 |
| JP | 2002-260274 | 9/2002 |
| JP | 2002-279711 | 9/2002 |

(Continued)

OTHER PUBLICATIONS

Jun. 23, 2009 Japanese official action in connection with a counterpart Japanese patent application No. 2005-130465.

(Continued)

*Primary Examiner* — Joseph Haley
*Assistant Examiner* — Ifedayo Iluyomade
(74) *Attorney, Agent, or Firm* — Cooper & Dunham LLP

(57) ABSTRACT

An optical recording medium is provided with at least a substrate, light absorbing and heat generating parts each of which absorbs light and generates heat, and recording parts, and each of the recording parts are formed between two recording tracks.

14 Claims, 13 Drawing Sheets

FOREIGN PATENT DOCUMENTS

| | | |
|---|---|---|
| JP | 2002-304771 | 10/2002 |
| JP | 2002-298432 | 11/2002 |
| JP | 2002-324339 | 11/2002 |
| JP | 2002-329315 | 11/2002 |
| JP | 2002-329326 | 11/2002 |
| JP | 2003-77127 | 3/2003 |
| JP | 2003-109247 | 4/2003 |
| JP | 2003-217176 | 7/2003 |
| JP | 2003-228880 | 8/2003 |
| JP | 2004-13942 | 1/2004 |
| JP | 2004-39106 | 2/2004 |
| JP | 2004-185687 | 7/2004 |
| JP | 2005-158191 | 6/2005 |
| JP | 2005-174424 | 6/2005 |
| JP | 2005-174425 | 6/2005 |
| JP | 2005-259212 | 9/2005 |
| JP | 2005-322365 | 11/2005 |
| JP | 2005-332452 | 12/2005 |
| WO | WO03/060900 A1 | 7/2003 |
| WO | WO2004/057593 A1 | 7/2004 |

OTHER PUBLICATIONS

Dec. 22, 2009 Japanese official action in connectionw with counterprt Japanese patent application No. 2006-054695.

Sep. 29, 2009 Japanese official action in connection with a counterpart Japanese patent application No. 2006-054695.

Apr. 10, 2010 Japanese official action in connection with a counterpart Japanese patent application.

* cited by examiner

The thickness direction

The radius direction

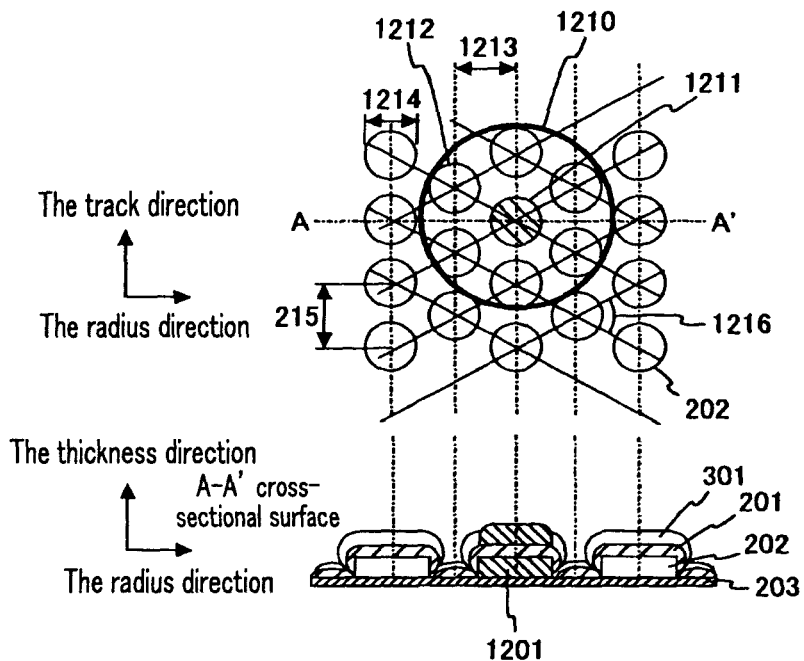
FIG. 19B
FIG. 19A
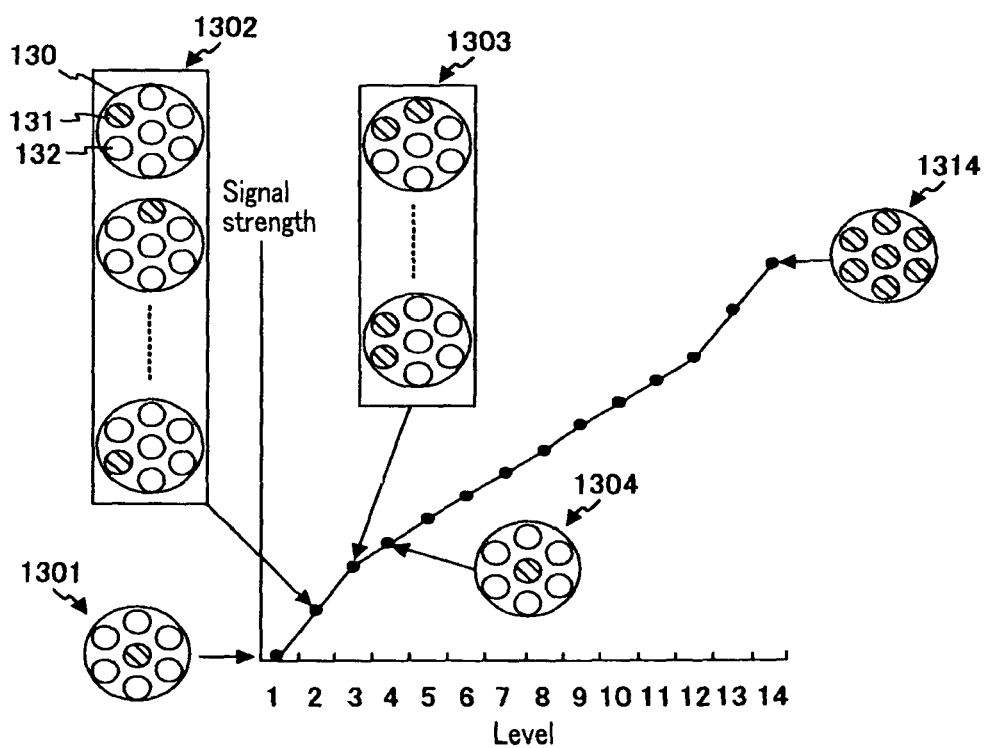
FIG. 20

OPTICAL RECORDING MEDIUM, AND RECORDING AND REPRODUCING METHOD

BACKGROUND

1. Technical Field

This disclosure relates to a recordable optical recording medium for use in recording information by means of laser beam irradiation and specifically relates to a recordable optical recording medium, which may be hereinafter referred to as "optical disc", capable of reducing the track pitch width to thereby obtain high-density recording, and the present invention also relates to a recording and reproducing method using the optical recording medium.

2. Description of the Related Art

It has been known that a margin is provided to track pitch of a recordable optical disc in order to prevent cross-write, cross-erase, and cross-talk events, which are caused from thermal interference between adjacent tracks. For example, when the wavelength of a laser beam for use is 405 nm, and the numerical aperture NA of an object lens of the optical system is 0.85, the track pitch of the optical disc is typically set to 320 nm or more.

For such optical discs in the prior art, there are many proposals on preventing cross-write, and cross-erase events. For example, with respect to structural characteristics of optical discs, the following optical discs have been proposed. Namely, an optical disc in which a recording area formed on a substrate is separated for each track, and a material having a smaller thermal conductivity than that of a recording material constituting the recording area is laid in between the tracks (see Japanese Patent Application Laid-Open (JP-A) No. 2000-276770); an optical disc in which a recording layer is provided only on guide grooves formed on the substrate, and no recording layer is laid in between the guide grooves (see Japanese Patent Application Laid-Open (JP-A) No. 2001-236689); an optical disc in which at both sides of boundary portions that land flat parts formed on the substrate make contact with inclined surfaces of boundaries between each of the lands and each grooves, convex portions each of which is higher than the flat part of land is formed consecutively and longitudinally to the land parts (see Japanese Patent Application Laid-Open (JP-A) No. 2004-39106); and an optical disc in which laminar structured recording layers are formed on adjoining land parts and groove parts on a quartz substrate in a discontinuous manner (see Japanese Patent Application Laid-Open (JP-A) No. 2001-266405), and the like.

However, it is extremely difficult to completely prevent cross-write and cross-erase events even with any of the optical disc structures in the prior art, and it is impossible to drastically reduce the track pitch width. The applicant proposed an optical recording medium in which a linear-shaped conductor in a direction parallel to the track direction of a laser beam is provided on the substrate (see Japanese Patent Application Laid-Open (JP-A) No. 2003-228880). However, in the proposal, an optical recording medium capable of providing completely satisfactory performance has not been obtained yet, and further improvements and developments are still required.

BRIEF SUMMARY

It is therefore an object of the present invention to provide In an aspect of this disclosure, there is provided a recordable optical recording medium capable of preventing cross-write and cross-erase events and drastically reducing the track pitch width, compared to conventional optical recording media, as well as a recording and reproducing method using the optical recording medium.

In an exemplary embodiment, the optical recording medium is provided with at least a substrate, light absorbing and heat generating parts, and recording parts formed on the substrate, and the recording parts are provided so as to be separated between two recording tracks.

In another aspect, a recording method is characterized in that the optical recording medium is irradiated with a laser beam from the light absorbing and heat generating part side, and the power level of the laser beam is increased by use of the period of recording parts in the track direction to thereby record information.

Another aspect of the recording and reproducing method is characterized in that the optical recording medium is irradiated with a laser beam from the light absorbing and heat generating part side, the power level of the laser beam is increased by use of the period of recording parts in the track direction to thereby record information on the optical recording medium, and the power level of the laser beam is increased by use of the period of the recording parts in the track direction to thereby detect signals of the information.

Another aspect of the recording and reproducing method is characterized in that the optical recording medium is irradiated with a laser beam from the light absorbing and heat generating part side, the power level of the laser beam is increased by use of the period of recording parts in the track direction to thereby record information on the optical recording medium, and signals of the information are detected by use of the period of the recording parts in the track direction.

BRIEF DESCRIPTION OF THE DRAWINGS

FIG. 19A is a cross-sectional view showing the optical recording medium of the present invention and the recording and reproducing method of the present invention, in which the recording parts with information recorded thereon are viewed cross-sectionally.

FIG. 19B is a plan view showing the state where the recording parts are viewed planarity.

FIG. 20 is a graph represents the reproducing method of the present invention and shows variations in signal level.

DESCRIPTION OF THE PREFERRED EMBODIMENTS

The optical recording medium of the present invention is provided with at least a substrate, light absorbing and generating parts each of which absorbs light and generates heat, and recording parts formed on the substrate and is further provided with other components in accordance with the necessity. The recording parts are separately formed between two recording tracks.

FIGS. 1A to 1E are respectively a cross-sectional view schematically showing an example of the recording medium of the present invention.

Figure 1A:
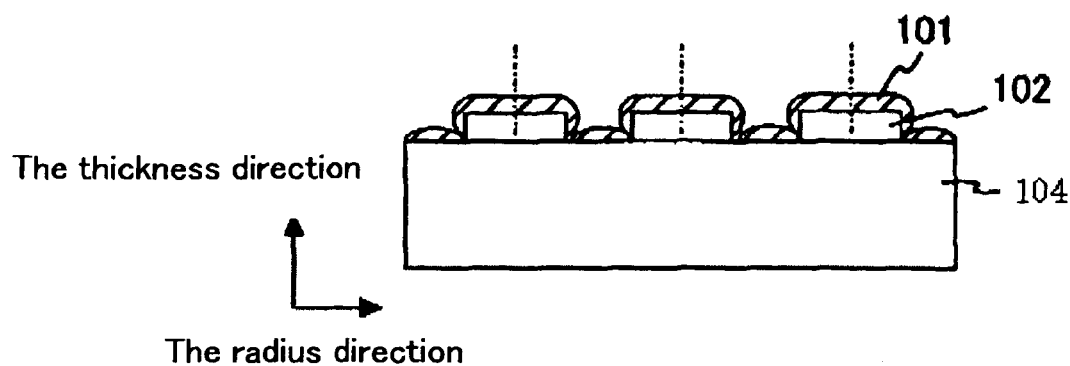
FIG. 1A is a cross-sectional view schematically showing an example of the optical recording medium of the present invention.

FIG. 1A exemplarily shows the structure of the optical recording medium according to the first aspect of the present invention. In FIG. 1A, the reference numeral 101 represents light absorbing and heat generating parts, 102 represents recording parts, and 104 represents a substrate. A plurality of laminar layers constituting recording parts 102 and light absorbing and heat generating parts 101 are separated provided in the radius direction of the optical recording medium. The recording parts 102 are formed in a circular shape or an ellipsoidal shape at a regular interval in the direction of the recording tracks, although the appearance cannot be seen from FIG. 1A. The first aspect of the optical recording medium of the present invention is characterized in that the recording parts 102 are provided at a regular interval in the direction of the recording track and are separately formed between two recording tracks.

According to the structure of the optical recording medium like this, thermal diffusion causing cross-write and/or cross-erase events can be prevented, and the spread of recording marks can be restricted to within the area of recording parts, and thus it is possible to obtain an optical recording medium capable of more drastically reduce the track pitch width than those of conventional optical recording media.

The material constituting the light absorbing and heat generating parts 101 is not particularly limited, provided that the material absorbs a recording beam and generates heat.

The material constituting the recording parts 102 is not particularly limited, provided that the material is changed or transformed by heat generated from the light absorbing and heat generating parts 101. The material used for the recording parts 102 may be same as that used for the substrate 104 or may be different from the material used for the substrate 104.

The height of the recording parts is 10 nm to 100 nm, and the diameter of the recording parts is 50 nm to 500 nm. The edges of the recording parts are preferably formed in an inverse tapered shape with respect to the perpendicular of the respective recording parts. The recording parts are formed in order to separate the light absorbing and heat generating parts formed in a laminar structure on the recording parts. By forming the edges of the recording parts in an inverse tapered shape with respect to the perpendicular of the respective recording parts, the drape of the light absorbing and heat generating parts formed in a laminar structure on the recording parts is reduced at the edge of the recording parts. With the reduced drape of the light absorbing and heat generating parts, the light absorbing and heat generating parts are separated with respect to each recording part.

As for the material of the substrate 104, glass, quarts, or the like may be used. Further, substrate materials used in producing semiconductors such as Si, SOI (silicon on insulator) may be used. In addition, it is possible to use substrates for HDD (hard disc) such as Al, and opaque glass substrates; and resin substrate materials such as polycarbonate resins, acrylic resins, polyolefin resins, epoxy resins, vinyl ester resins, PET resins (polymers or copolymers of polyethylene terephthalate, polybutylene telephthalate, ethylene (tere)phthalate, butylene terephthalate, and ethylene naphthalate) and ultraviolet curable resins.

When information is recorded, the recording parts 102 are changed or transformed by heat generated from the light absorbing and heat generating parts 101. The pattern of change or the recorded pattern differs depending on the material used for the recording parts. For example, the density of the materials used for the recording parts may be changed, or the portions to which a laser beam is applied may be highly densified. The crystalline condition of the material used for the recording parts may be changed. Elements of the materials used for the light absorbing and heat generating parts 101 and the recording parts 102 may be diffused each other between the light absorbing and heat generating parts 101 and the recording parts 102. The light absorbing and heat generating parts 101 and the recording parts 102 may be deformed. In addition, the light absorbing and heat generating parts 101, the recording parts 102, and the substrate 104 may be deformed.

Figure 1B:
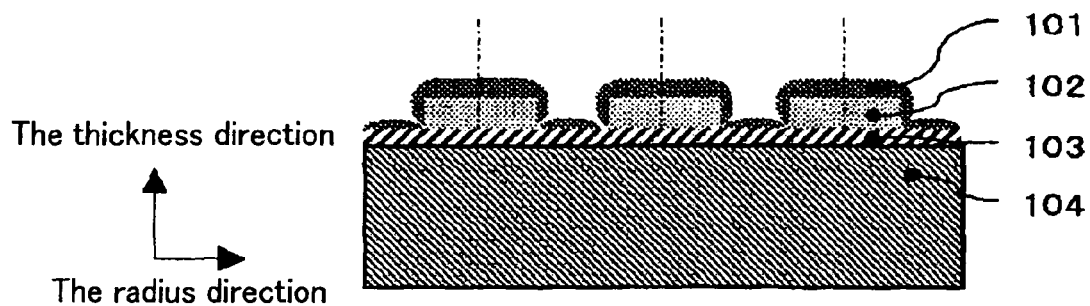
FIG. 1B is a cross-sectional view schematically showing another example of the optical recording medium of the present invention.

Next, in FIG. 1B, the reference numeral 101 represents light absorbing and heat generating parts, 102 represents recording parts, 103 represents light absorbing and heat generating parts, and 104 represents a substrate 104, and a plurality of laminar layers constituting recording parts 102 and light absorbing and heat generating parts 102 are separately formed in the radius direction of the optical recording medium. The recording parts are provided in a linear shape which consecutively exists along with recording tracks and are separately formed between adjacent recording tracks. The optical recording medium of the present invention is characterized in that the recording parts 102 are formed in the state where the recording parts are separated between two recording tracks.

As for the recording material constituting the recording parts 102, when a silicon compound is represented as material A, and at least one selected from the group consisting of sulfide materials, selenide materials, fluoride materials, nitride materials is represented as material B, the recording material preferably contains material A and material B.

Examples of the silicon compound of material A include $SiO_2$, and SiON.

Examples of the sulfide material of material B include ZnS, CaS, and BaS.

Examples of the selenide material of material B include ZnSe, and BaSe.

Examples of the fluoride material of material B include $CaF_2$, and $BaF_2$.

Examples of the nitride material of material B include AlN, GaN, and SiN.

In the present invention, by using a mixture which contains a material A which is a silicon compound, the thermal conductivity of the recording parts can be reduced. During recording information, the laser beam is absorbed into the light absorbing and heat generating parts 101, the recording parts are changed or transformed by heat generated from the light absorbing and heat generating parts 101 to thereby form recording marks. Since the recording parts have a low conductivity, and the thermal diffusion can be prevented, microscopic recording marks can be formed. Since microscopic recording marks can be formed, it is possible to improve the recording density of the optical recording medium. As mentioned above, the laser beam applied to the light absorbing and heat generating parts is absorbed into the heat generating material of the light absorbing and heat generating parts, and the absorption of the laser beam leads to generation of heat from the heat generating material.

The heat generating material constituting the light absorbing and heat generating parts 101 and the light absorbing and heat generating parts 103 is not particularly limited, provided that the material absorbs a recording beam and generates heat, however, it is preferable to use at least one selected from the group consisting of phase-change materials, semiconductor materials, low-melting point metallic materials, intermetallic compound materials, and oxide materials. By using light absorbing and heat generating parts as described above, the recording parts can be separated by a simple and easy method. In addition, when information is reproduced, resolution-limited microscopic marks can be reproduced. It is noted that the material used for the light absorbing and heat generating parts 101 may be same as the material used for the light absorbing and heat generating parts 103 or may be different from that of the light absorbing and heat generating parts 103.

As for the phase-change material, it is preferably that the material contains Sb and Te, and the atomic ratio of Sb to Te, Sb/Te, be in the range of 1 to 4, and preferred examples of such a material include Sb (70 atomic %)/Te (30 atomic %); Sb (75 atomic %)/Te (25 atomic %); and Sb (80 atomic %)/Te (20 atomic %). The SbTe having a atomic ratio of Sb to Te (Sb/Te) ranging from 1 to 4 may contain elements other than Sb and Te. Examples of the elements include Ag, In, Ge, and Ga. Examples of the phase-change material include Ag—In—Sb (65 atomic %)-Te (25 atomic %); Ag—In—Sb (60 atomic %)-Te (30 atomic %); Ge—Sb (70 atomic %)-Te (25 atomic %); Ga—Sb (70 atomic %)-Te (25 atomic %); and Ge—Ga—Sb (65 atomic %)-Te (25 atomic %).

Examples of the semiconductor materials include Si, and Ge. Examples of the low-melting point metallic materials include Bi, In, and Sn.

As for the intermetallic compound materials, it is possible to use a compound material containing a metal having a low-melting point such as Bi, Ga, In, and Sn, and specific examples thereof include BiTe, BiIn, GaSb, GaP, InP, InSb, InTe, and SbSn.

Examples of the oxide materials include $V_2O_5$, $Cr_2O_3$, $Mn_3O_4$, $Fe_2O_3$, $Co_3O_4$, CuO, and ZnO.

The recording and reproducing beam used in the present invention is a laser beam. For the laser source of the laser beam, a semiconductor laser is used. The wavelength of the semiconductor laser is preferably 370 nm to 780 nm and more preferably 390 nm to 410 nm. For example, a semiconductor laser made of a GaN-based material is used. The numerical aperture (NA) of the object lens is preferably 0.5 to 2.0 and more preferably 0.8 to 0.95.

The method to process the recording part 102 in a linear form to separate the recording part 102 with respect to each recording track is as follows:

The recording part 102 before separating is formed in a thin layer and disposed on the light absorbing and heat generating part 103. A laser beam is applied to a portion determined as a recording track. The leaser beam is absorbed into the light absorbing and heat generating part 103 to change or transform a portion of the recording part formed in a thin layer by heat generated from the light absorbing and heat generating part 103. The transformed portion of the recording part is improved in etching resistance. By subjecting an optical recording medium to the etching treatment, portions of the recording part formed in a thin layer remains as it is to thereby form the recording parts 102 which are separated with respect to each recording tracks, as can be seen in FIG. 1B. Then, a heat generating material is disposed on the separated recording parts 102 to thereby form the light absorbing and heat generating parts 101.

The method for recording information on the optical recording medium shown in FIG. 1B is described as follows:

The light absorbing and heat generating parts 101 and the recording parts 102 each of which are formed in laminar structure are irradiated with a laser beam from the side of light absorbing and heat generating parts 101. The laser beam is absorbed into the light absorbing and heat generating part 101, and the recording part 102 is changed or transformed by heat generated from the light absorbing and heat generating part 101. The power level of the laser beam used during recording is set so as to be higher than the power level of the laser beam at the time when the recording parts 102 are formed. In this way, information is recorded by means of transformation of the recording parts.

The method for reproducing information on the optical recording medium shown in FIG. 1B is described as follows:

When reproducing recorded information, the laser beam is absorbed into the light absorbing and heat generating part 101 to change the optical property of the light absorbing and heat generating part 101 by generation of heat. Here, the power level of the laser beam is set such that the optical property of the light absorbing and heat generating part 101 is changed in an area smaller than the laser beam diameter. By changing the optical property of the light absorbing and heat generating part 101 at a portion within the laser beam diameter, an optical aperture which is smaller than the laser beam diameter is virtually formed on the light absorbing and heat generating part 101. Owing to the small optical aperture, microscopic recording marks which reach the resolution limit with a typically used beam diameter can be reproduced. Here, the resolution limit means a period having a value of $\lambda/2NA$ or less, when the wavelength of the recording and reproducing beam is represented by $\lambda$, and the numerical aperture of the object lens is represented by NA. The method for reproducing resolution-limited recording marks as periodic signals is called super-resolution reproduction. In the present invention, resolution-limited microscopic recording marks can be reproduced by forming light absorbing and heat generating parts which contain at least one selected from the group consisting of phase-change materials, semiconductor materials, low-melting point metallic materials, intermetallic compound materials, and oxide materials.

Figure 1C:
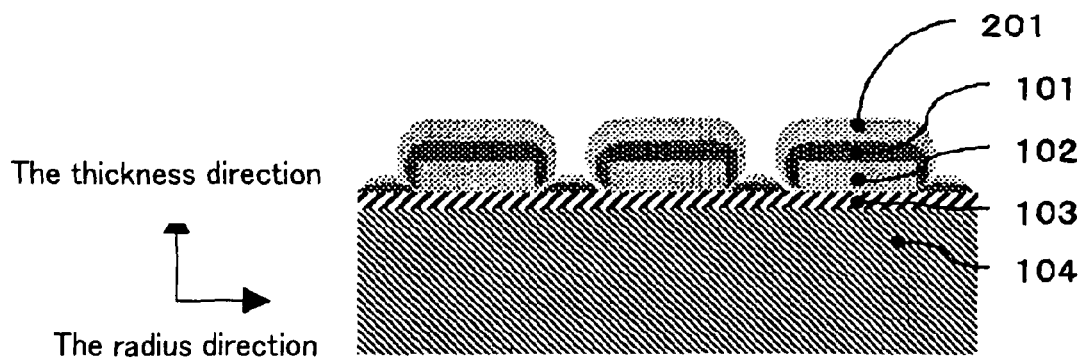
FIG. 1C is a cross-sectional view schematically showing still another example of the optical recording medium of the present invention.

FIG. 1C is a view showing an example of the optical recording medium of the present invention of which recording parts 201 are further disposed on the light absorbing and heat generating parts 101. During recording information, a recording beam is absorbed into the light absorbing and heat generating part 101, and a recording part is changed or transformed by heat from the light absorbing and heat generating part to thereby form recording marks. Since heat transfers up and down, recording parts 201 and 102 can be formed on and under the light absorbing and heat generating part 101.

Figure 1D:
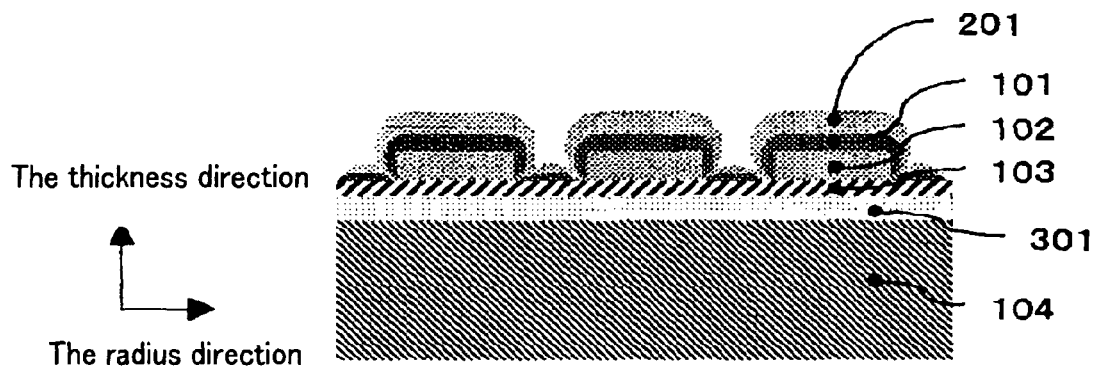
FIG. 1D is a cross-sectional view schematically showing still another example of the optical recording medium of the present invention.

FIG. 1D is a view showing an example of the optical recording medium of the present invention of which thermal conduction-suppressing layer 301 made of a thermal conduction-suppressing material is formed between the substrate 104 and the light absorbing and heat generating parts 103 in the structure shown in FIG. 1C. The thermal conduction-suppressing layer 301 is formed in order to prevent thermal diffusion from the light absorbing and heat generating layer 103 to the substrate 104.

The thermal conduction-suppressing material is not particularly limited provided that the material is capable of prevent thermal conduction, and may be selected in accordance with the intended use. Examples thereof include silicon compound materials such as $SiO_2$, SiON, SiN; and fluoride materials such as $CaF_2$, and $BaF_2$. In addition, similarly to the recording parts 201 and 102, a mixture material of a silicon oxide determined as a material A and a material B may be used as the thermal conduction-suppressing material. Here, the material A is a silicon oxide, and the material B is one selected from the group consisting of sulfide materials, selenide materials, fluoride materials, nitride materials, metallic materials, and semiconductor materials. Examples of the silicon oxide of material A include $SiO_2$, and SiON.

Examples of the sulfide material of material B include ZnS, CaS, and BaS.

Examples of the selenide material of material B include ZnSe, and BaSe.

Examples of the fluoride material of material B include $CaF_2$, and $BaF_2$.

Examples of the nitride material of material B include AlN, GaN, and SiN.

Figure 1E:
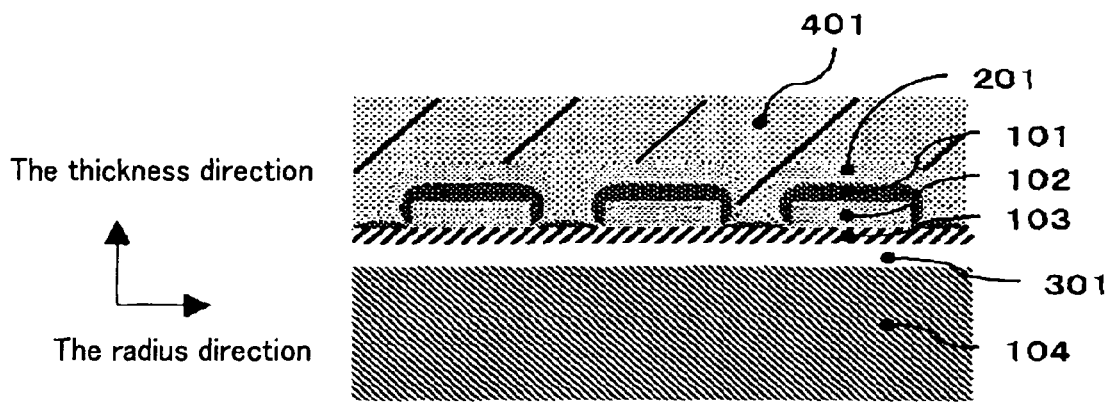
FIG. 1E is a cross-sectional view schematically showing still another example of the optical recording medium of the present invention.

FIG. 1E is a view showing an example of which protective layer 401 is formed as the top layer in the layer thickness direction in the structure shown in FIG. 1D. The protective layer 401 is formed in order to protect the optical recording medium.

The material used for the protective layer 401 is not particularly limited and may be suitably selected in accordance with the intended use. Examples thereof include silicon compounds such as SiN, $SiO_2$, SiON, and SiC; and translucent resin materials such as polycarbonate, acrylic resins, polyolefin resins, epoxy resins, vinyl ester resins, polyethylene terephthalate (PET), and ultraviolet curable resins. Each of these materials may be used alone to form a single protective layer.

Figure 2:
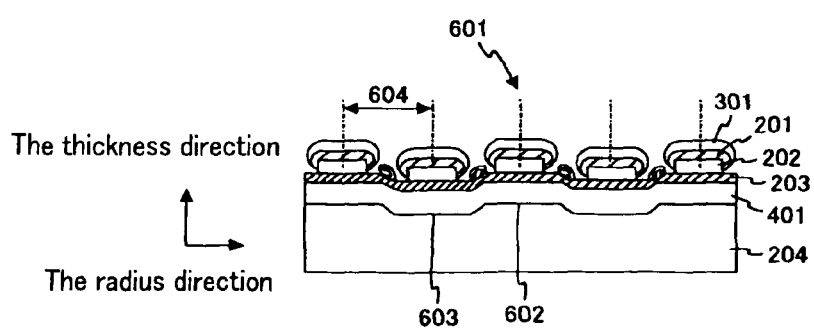
FIG. 2 is a cross-sectional view schematically showing an example of the optical recording medium of the present invention.

FIG. 2 is a view showing another aspect of the optical recording medium of the present invention.

For the optical recording medium shown in FIG. 2, an optical recording medium having the same structure as in FIG. 1C is used. The reference numeral 301 represents a recording part; 201 represents a light absorbing and heat generating part; 202 represents a recording part; 203 represents a light absorbing and heat generating part; 401 represents a thermal conduction-suppressing part; and 204 represents a substrate. The reference numeral 601 indicates the direction of laser beam irradiation at the time of recording or reproducing information.

The substrate 204 has guide grooves or convex portions 603 and concave portions 603 for the recording and reproducing beam. The depth of the concave portions is ranging from 10 nm to 100 nm. The reference numeral 604 represents the track pitch.

As shown in FIG. 2, the substrate 204 has concave portions 603 and convex portions 602, the recording parts 202 formed in a circular shape or an ellipsoidal shape respectively exist on the concave portions and convex portions. The concave portions 603 and convex portions 602 may be formed concentrically or in a spiral manner on the substrate 204.

When information is recorded or reproduced, tracking is performed for the convex portions 602 or concave portions 603. For the method of tracking, push-pull method or differential push-pull method may be used. Owing to the presence of the concave convex portions on the substrate, push-pull signals can be produced without receiving influence from the shape of the recording parts. Thus, tracking can be stably performed with a recording and reproducing beam.

Figure 3A:
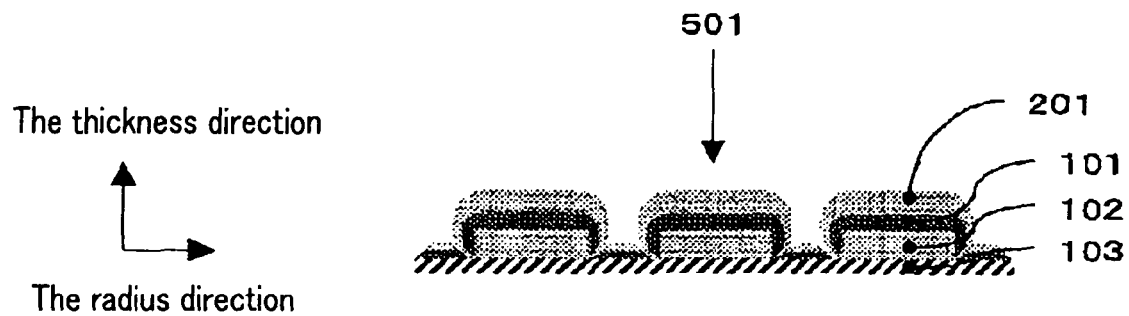
FIG. 3A is a partially cross-sectional view schematically showing the state of the optical recording medium of the present invention before information is recorded.
Figure 3B:
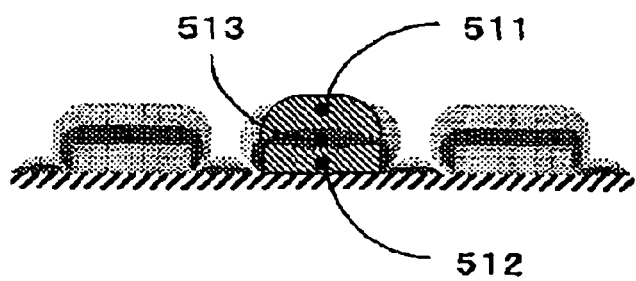
FIG. 3B is a partially cross-sectional view schematically showing the state of the optical recording medium of the present invention after information is recorded.

FIG. 3A and FIG. 3B respectively show a recorded state using the structure of the optical recording medium of the present invention. FIG. 3A shows the state of the optical recording medium before information is recorded. Just as in the structure shown in FIG. 1B, the reference numeral 201 represents a recording part, 101 represents a light absorbing and heat generating part, 102 represents a recording part, and 103 represents a light absorbing and heat generating part. The reference numeral 501 indicates the direction of the recording and reproducing beam. FIG. 3B shows the state of the optical recording medium after information is recorded. The reference numerals 511 and 512 respectively represent a recording mark.

The recording parts 201 and 102 formed on and under the light absorbing and heat generating part 101 are changed or transformed by heat from the light absorbing and heat generating part 101. The reference numerals 511 and 512 in FIG. 3B respectively show the state where the recording parts are transformed. A transformed state of the recording part i.e. a recorded pattern represents a change in density of the recording material. In other words, in the transformed portions 511 and 512 of the recording parts, the recording material is more densified than in the portions other than the transformed portions 511 and 512. In the recorded pattern, elements of the light absorbing and heat generating part 513 and the recording parts 511 and 512 may be mutually fused each other. In other words, elements constituting the light absorbing and heat generating part may be mutually mixed with elements constituting the recording parts. Owing to occurrence of mutual diffusion of these elements, the optical contrast of the recorded portion to unrecorded portions or recording parts other than 511 and 512 is increased to thereby increase the intensity of reproductive signals. In addition, in the recorded pattern, the light absorbing and heat generating part 101 and the recording parts 511 and 512 may be deformed. Namely, the light absorbing and heat generating part 513 may be deformed, and the recording parts 511 and 512 may be deformed in accordance with the transformation of the light absorbing and heat generating part 513. Owing to the occurrence of the transformation to a light absorbing and heat generating part and recording parts, the optical contrast of the recorded portion to unrecorded portions or recording parts other than 511 and 512 is increased to thereby increase the intensity of reproductive signals.

To use material A and material B as the material for recording parts 201 and 102 is described as above. Further, when at least one selected from silver, platinum, and palladium is mixed as material C with materials A and B, materials A, B, and C are uniformly dispersed before information is recorded, however, when recording is performed, in high-temperature portions to which a laser beam is applied (511 and 512 in FIG. 3B), a change of pattern occurs as described above, and the material C agglutinates. The agglutination of material C which is a metallic material enables increasing the optical contrast between the recorded portion and unrecorded portions or recording parts other than 511 and 512 and then to increase the intensity of reproductive signals.

Figure 4:
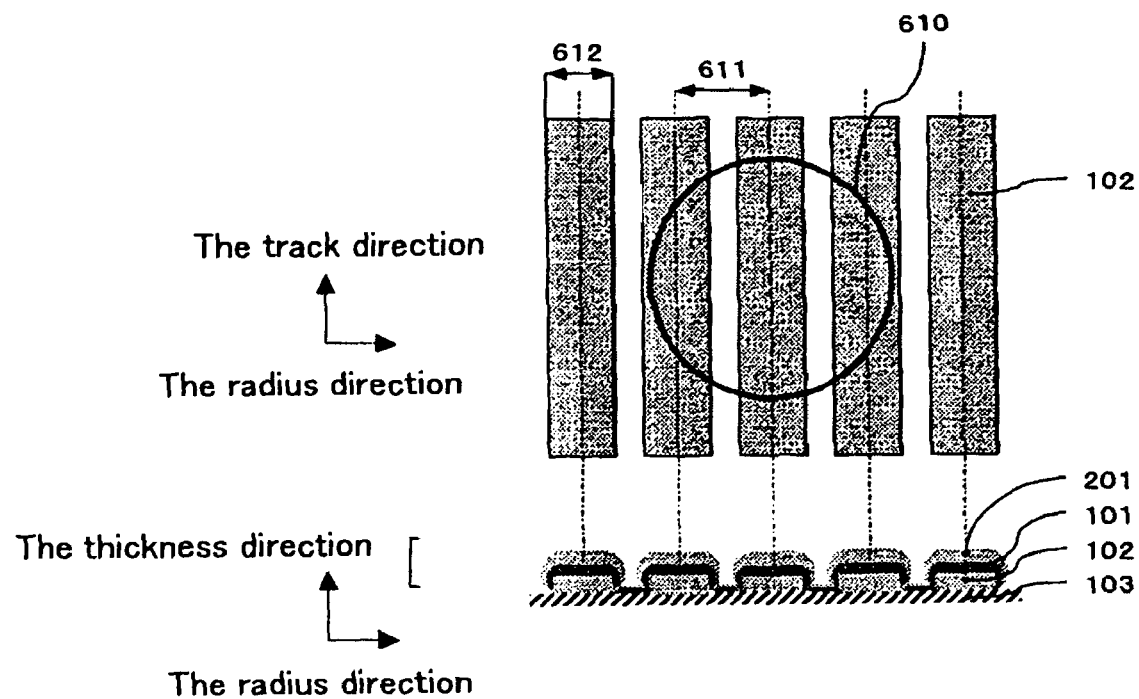
FIG. 4 is a view showing an example of the optical recording medium of the present invention, in which the upper portion of the view shows the state where the optical recording medium is planarity viewed, and the lower portion of the view shows the state where the optical recording medium is viewed cross-sectionally.

FIG. 4 is a view showing an example of the structure of the optical recording medium with a cross-sectional view and a plan view. The lower portion of the view represents the state where the optical recording medium is viewed cross-sectionally. The upper portion of the view represents the state where the optical recording medium is planarity viewed. Each of recording parts 102 continuously exists in a laminar form along with recording tracks and are formed in a completely separated between adjacent recording tracks.

Next, the recording principle and the effect of the optical recording medium of the present invention will be described with comparing the structure of a conventional optical recording medium shown in FIG. 5 to the structure of the optical recording medium of the optical recording medium shown in FIG. 6.

Figure 5:
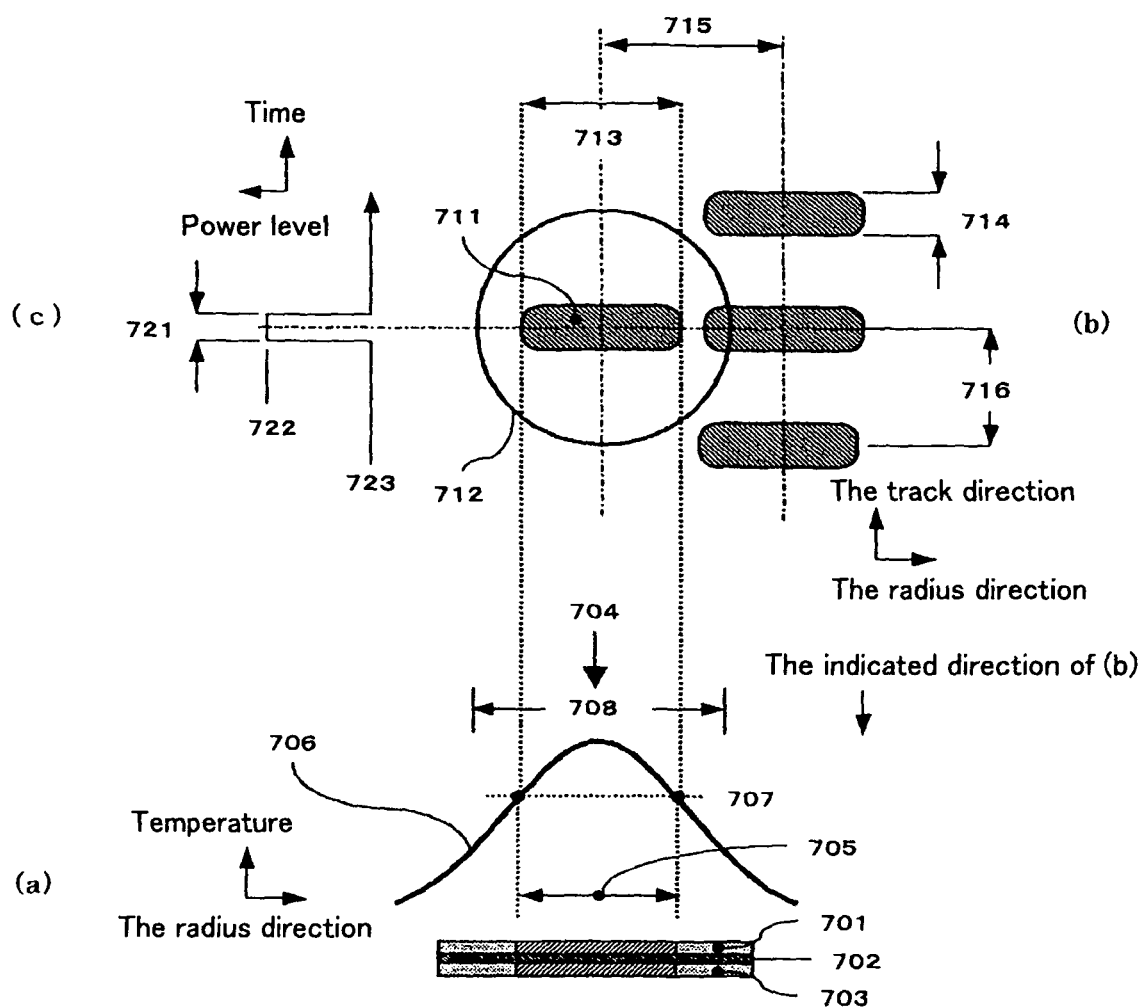
FIG. 5 is a view showing a state where information is recorded on a conventional optical recording medium, in which (a) shows the state where the optical recording medium is viewed cross-sectionally, and the temperature distribution graph at the time of recording; and (b) shows the state where the optical recording medium is viewed planarity and represents the method for modulating the laser power at the time of recording.

In FIG. 5, the conventional optical recording medium has a structure in which only a thin layer is disposed on a substrate.

In FIG. 5, (a) shows the state where the optical recording medium is viewed cross-sectionally, and the temperature distribution graph at the time of recording. The reference numeral 701 represents a recording part, 702 represents a light absorbing and heat generating part, and 703 represents a recording part. Each of the recording parts are formed in a thin layer and is not separated on the surface of the optical recording medium. The reference numeral 704 indicates the direction of the laser beam irradiation. The reference numeral 705 represents a recording mark, and the arrow indicates the size of the recording mark in the radius direction of the optical recording medium, which may be hereinafter referred to as "recording mark width". The reference numeral 706 represents the temperature distribution of the light absorbing and heat generating part 702 when a laser beam is applied to the light absorbing and heat generating part 702. Namely, it is the temperature distribution in the radius direction of the optical recording medium. The reference numeral 707 represents the recording temperature, and the reference numeral 708 represents the laser beam diameter. The temperature distribution of the light absorbing and heat generating part 702 reflects distribution of the intensity of the laser beam to form a Gaussian distribution. A portion of which the temperature is raised to the recording temperature 707 or more in the recording part is changed to form a recording mark.

In FIG. 5, (b) shows the state where the optical recording medium is viewed planarity from the laser beam irradiation side and represents a recorded state at the time of recording. The reference numeral 711 represents a recording mark, 712 represents the laser beam diameter, and 713 represents the recording mark width. The reference numeral 714 represents the size of the recording mark in the track direction, which may be hereinafter referred to as "recording mark length". The reference numeral 715 represents a track pitch, and the reference numeral 716 represents the period of the recording mark in the track direction, which may be hereinafter referred to as "recording period".

In FIG. 5, (c) represents the method for modulating the laser power at the time of recording. The reference numeral 721 represents a recording pulse width, 722 represents the recording power level, and 723 represents the bias power level. By making the pulse width 721 short, it is possible to control the temperature distribution in the track direction to thereby shorten the mark length 714. As shown in (a) of FIG. 5, since the temperature distribution in the radius direction of the optical recording medium follows the distribution of the intensity of the laser beam, the mark width 713 cannot be formed as short as the mark length 714. Accordingly, with a conventional optical recording medium, the recording mark 711 is widened in the radius direction of the optical recording medium. Then, to avoid overlapping or cross-write of recording marks, a margin is allowed for the track pitch 715. The width of the track pitch 715 cannot be reduced to the mark width 713 or less.

Figure 6:
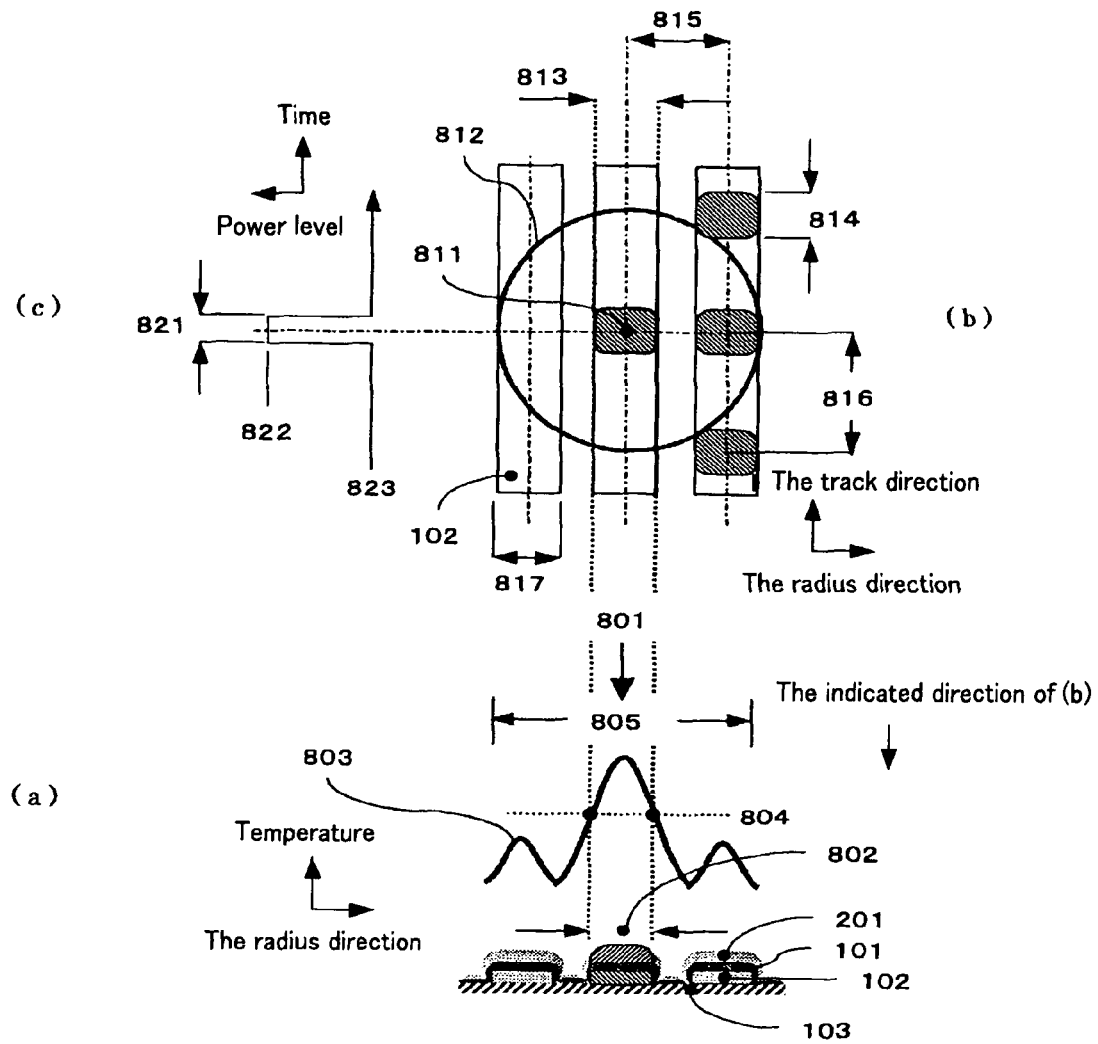
FIG. 6 is an illustration of the recording principle showing the state where information is recorded on the optical recording medium of the present invention, in which (a) shows the state where the optical recording medium is viewed cross-sectionally, and the temperature distribution graph at the time of recording; (b) represents the state where the optical recording medium is viewed planarity; and (c) represents the method for modulating the laser power at the time of recording.

FIG. 6 is a view showing the structure of the optical recording medium of the present invention, and each of the recording parts are formed in a linear shape. In FIG. 6, (a) shows the state where the optical recording medium is viewed cross-sectionally, and the temperature distribution at the time of recording. The reference numeral 201 represents a recording part, 101 represents a light absorbing and heat generating part, 102 represents a recording part, and 103 represents a light absorbing and heat generating part. Each of the recording part 102 is formed in a linear shape and completely separated in the radius direction of the optical recording medium. The reference numeral 801 indicates the direction of the laser beam irradiation, 802 represents a recording mark, and the space between the arrows represents the recording mark width. The reference numeral 803 represents the temperature distribution of the light absorbing and heat generating parts in the radius direction of the optical recording medium at the time when the laser beam is applied to the light absorbing and heat generating part.

The reference numeral 804 represents the recording temperature, and 805 represents the laser beam diameter. Each of the recording part 201 and each of the light absorbing and heat generating part 101 are disposed on the recording part 102 formed in a linear shape and separately provided in the radius direction of the optical recording medium. Since each of the light absorbing and heat generating part 101 is separately provided, thermal diffusion on the surface of the optical disc can be restricted to make the portion of the light absorbing and heat generating part positioned at the center of the laser beam diameter is particularly subjected to high-temperature. The portion with an elevated temperature of recording temperature of 804 or more is formed as a recording mark.

In FIG. 6, (b) represents the state where the optical recording medium is viewed planarity from the laser beam irradiation side and represents a recorded state at the time of recording. The reference numeral 102 represents a recording part formed in a linear shape. The reference numeral 811 represents a recording mark, 812 represents the laser beam diameter, 813 represents the recording mark width, 814 represents the recording mark length, 815 represents the track pitch, 816 represents the period of the recording mark, and 817 represents the width of the recording part 102.

In FIG. 6, (c) represents the method for modulating the laser power at the time of recording. The reference numeral 821 represents the recording pulse width, 822 represents the recording power level, and 823 represents the bias power level. Since the portion with a temperature of the recording temperature 804 or more is formed as a recording mark, the spread of the recording mark width 813 in the radius direction can be restricted to the width of the recording part 817 or less. The recording mark can be shortened both in the track direction and the radius direction of the optical recording medium. Since the recording mark width 813 can be reduced, the track pitch 815 can be narrowly set.

In the optical recording medium of the present invention, when the wavelength of the recording and reproducing beam is represented by $\lambda$, and the numerical aperture of the object lens is represented by NA, it is preferable that the track pitch which is a period of the separated recording part in the radius direction of the optical recording medium be a value of $\lambda/2NA$ or less, and the width of the separated recording part be 0.6 times to 0.9 times the track pitch width. This configuration relates to the layout of an optical disc surface of recording parts of the optical recording medium of the present invention.

Hereinafter, the optical recording medium of the present invention will be described referring to FIG. 4. The lower portion of FIG. 4 shows only recording parts and light absorbing and heat generating parts of the optical recording medium of the present invention when the optical recording medium is viewed cross-sectionally. The reference numeral 201 represents a recording part, 101 represents a light absorbing and heat generating part, 102 represents a recording part, and 103 represents a light absorbing and heat generating part. The upper portion of FIG. 4 shows only recording parts of the optical recording medium of the present invention when the optical recording medium is viewed planarity, and shows recording parts 102 in common to those in FIGS. 1A to 1E.

In FIG. 4, the reference numeral 610 represents the laser beam diameter. When the laser wavelength is represented by $\lambda$, and the numerical aperture of the object lens of the used optical system is represented by NA, the laser beam diameter is roughly calculated using the expression of $0.82 \times \lambda/NA$.

Each of the laser beam diameters to be described hereinafter is a value roughly calculated using the expression. The reference numeral 611 represents the period of the recording part in the radius direction of the optical recording medium. The period may be referred to as "track pitch". When the wavelength of the recording and reproducing beam is represented by $\lambda$, and the numerical aperture of the object lens is represented by NA, the track pitch 611 has a value of $\lambda/2NA$ or less. The reference numeral 612 represents the width of recording parts formed in a linear shape. The width of the recording parts is the value calculated by the expression of track pitch × (0.6 to 0.9). Like the recording principle as illustrated in FIG. 6, a recording mark in a recording part is formed on the optical recording medium of the present invention. Thus, the narrower the width of the recording part 612, the narrower the width of the recording mark. However, when the width of a recording mark is narrowed, the signal intensity is reduced, and so the width of recording parts is preferably set within the range of 0.6 times to 0.9 times the track pitch.

In the optical recording medium of the present invention, it is preferably that the substrate has concave and convex portions which are guide grooves for a recording and reproducing beam; recording parts be formed on the concave and convex portions of the guide grooves; and each of the recording parts separately provided between the concave and convex portions. This means that the recording parts are formed on concave and convex portions when viewed cross-sectionally from the optical recording medium, and the recording parts are formed in a state where each of the recording parts is separated between a convex portion and a concave portion.

Figure 7:
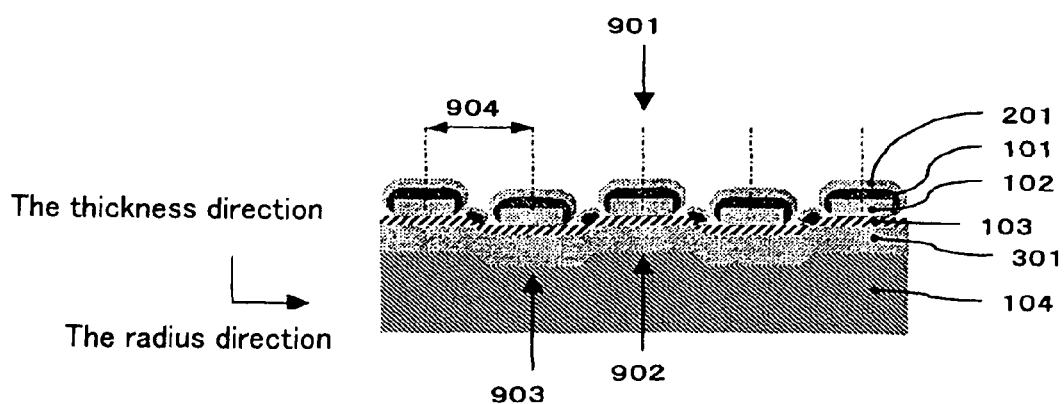
FIG. 7 is a cross-sectional view schematically showing an example of the optical recording medium of the present invention.

Hereinafter, the optical recording medium of the present invention will be described referring to FIG. 7. FIG. 7 is a cross-sectional view of the optical recording medium of, the present invention. The reference numeral 201 represents a recording part, 101 represents a light absorbing and heat generating part, 102 represent a recording part, 103 represents a light absorbing and heat generating part, 301 represents a thermal conduction-suppressing layer, and 104 represents a substrate. The reference numeral 901 indicates the direction of the laser beam irradiation at the time of recording or reproducing information. On the substrate 104, groove guides for a recording and reproducing beam or concave and convex portions are formed. The reference numeral 902 represents convex portions, 903 represents concave portions, and 904 represents the track pitch. As shown in FIG. 7, the recording parts formed in a linear shape are formed on the concave portions 903 and convex portions 902. When information is recorded or reproduced, the convex portions 902 and concave portions 903 are irradiated with a laser beam for tracking.

For the method for tracking, any one of push-pull method and differential push-pull (DPP) method may be used. Since concave and convex portions are formed on the substrate, push-pull signals can be formed without receiving influence of the shape of the recording parts. Thus, tracking can be stably performed.

Next, the period of recording parts in the optical recording medium of the present invention will be described.

When the wavelength of the recording and reproducing beam is represented by $\lambda$, and the numerical aperture of the object lens is represented by NA, the period (track pitch) Pt of the recording parts formed in a circular shape or an ellipsoidal shape in the radius direction of the optical recording medium has a value of $\lambda/2NA$ or less.

Figure 17:
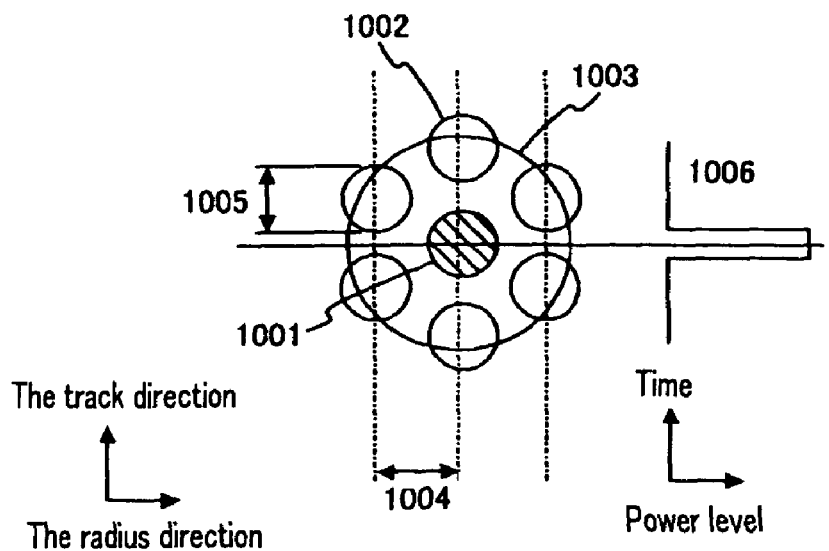
FIG. 17 is a plan view showing the recording method of the present invention and the state where information is recorded on the optical recording medium.

In the plan view shown in FIG. 17, the reference numeral 1003 represents a laser beam diameter.

The reference numeral 1004 represents a track pitch which is a period of the recording part in the radius direction.

The reference numeral 1005 represents a diameter of a recording part. When the wavelength of the recording and reproducing beam is represented by $\lambda$, and the numerical aperture of the object lens is represented by NA, the track pitch (Pt) 1004 has a value of $\lambda/2NA$ or less. For example, when the wavelength of the recording and reproducing beam is 405 nm, and the numerical aperture of the object lens is 0.85, the track pitch is set to be a value in the range of 150 nm to 230 nm.

According to the optical recording medium of the present invention, when the period of recording parts is set to be a value equal to or less than $\lambda/2NA$ to increase the recording density, it is possible to make the optical recording medium in a super-resolution reproduction state to prevent cross-talk events to thereby reproduce resolution-limited microscopic recording marks.

The super-resolution reproduction means a phenomenon that a mark recorded in a period shorter than the resolution limit is observed as a period signal. In the present invention, the value of $\lambda/2NA$ is defined as the resolution limit when the wavelength of the laser beam is represented by $\lambda$, and the numerical aperture of the object lens is represented by NA.

Next, the arrangement of recording parts in the optical recoding medium of the present invention will be described.

When the wavelength of the recording and reproducing beam is represented by $\lambda$, and the numerical aperture of the object lens is represented by NA, the period (track pitch) Pt of a recording part formed in a circular shape or an ellipsoidal shape has a value of $\lambda/2NA$ or less. FIG. 19A is a view showing the arrangement of the recording parts using the optical recording medium shown in FIG. 2. FIG. 19A shows the cross-sectional surface A-A' of FIG. 19B. FIG. 19B shows the optical recording medium when it is viewed planarity.

In FIG. 19A, the reference numeral 301 represents a recording part, 201 represents a light absorbing and heat generating part, 202 represents a recording part, 203 represents a light absorbing and heat generating part, and 1201 represents a recording part (recording mark) in a recorded state.

In FIG. 19B, only recording parts 202 are shown.

The reference numeral 1210 represents a laser beam diameter. The reference numeral 1211 represents a recording part positioned at the center of the beam diameter, 1212 represents recording parts other than the recording part positioned at the center of the beam diameter, 1213 represent the track pitch, 1214 represent the diameter of a recording part, 1215 represents the period of a recording part in the track direction, and 1216 represents the angle formed between the center line of a recording part and the center line of a recording part.

When the wavelength of the recording and reproducing beam is represented by $\lambda$, and the numerical aperture of the object lens is represented by NA, the track pitch 1214 has a value of $\lambda/2NA$ or less. For example, when the wavelength of the recording and reproducing beam is 405 nm, and the numerical aperture of the object lens is 0.85, the track pitch is set to be in the range of 100 nm to 230 nm. With the structure of the optical recording medium, recording marks can be formed in accordance with recording parts, and the recording marks are formed in a circular shape. Thus, the smaller the diameter 1214 of a recording part, the diameter of the recording mark 1201 can be made smaller. However, the diameter of a recording mark is narrowed, the signal intensity is reduced.

Thus, it is preferably that the diameter 1214 of the recording part be set to 0.6 times to 1 time the track pitch. For example, when the wavelength of the recording and reproducing beam is 405 nm, and the numerical aperture of the object lens is 0.85, the diameter of the recording part is preferably in the range of 60 nm to 230 nm. The recording parts 202 on the surface of the optical recording medium are arranged in a close-packed trigonal arrangement. The angle 1216 is approx. 60°. The recording parts 202 are formed at a regular interval in the track direction and the radius direction.

According to the optical recording medium of the present invention, when the period of recording parts is set to a value of $\lambda/2NA$ or less to increase the recording density, recording parts are arranged in a trigonal arrangement to utilize crosstalk and to thereby judge recorded information based on multi-valued decision.

In the optical recording medium of the present invention, on a substrate, recording parts are arranged closer to the substrate, and light absorbing and heat generating parts are arranged at more distant from the substrate. The recording parts and the light absorbing parts may be disposed in a laminar structure such that each of the light absorbing and heat generating parts are contact with and formed on each of the recording parts. Alternatively, a different layer may be inserted between the recording parts and the light absorbing and heat generating parts. By making the light absorbing and heat generating parts disposed at higher position than the recording parts when viewed from the substrate side like the above-noted configuration, it is possible to record information by irradiating the optical recording medium with a laser beam from the light absorbing and heat generating part side. Namely, by applying a laser beam to the optical recording medium from the light absorbing and heat generating parts, the light can be effectively absorbed into the light absorbing and heat generating parts to thereby reduce the laser power needed for recording and reproducing information. Further, by applying a laser beam to the optical recording medium from the light absorbing and heat generating parts without passing through the substrate, the numerical aperture (NA) of the object lens can be set in a large size, and by increasing the numerical aperture (NA) of the object lens, the laser beam spot diameter can be reduced to thereby increase the recording density.

The recording method of the present invention is characterized in that the optical recording medium of the present invention is irradiated with a laser beam from the light absorbing and heat generating part side, and information is recorded by increasing the laser power level by use of the period of recording parts in the track direction.

In this case, the optical recording medium is preferably provided with a substrate, recording parts, and light absorbing and heat generating parts disposed in a laminar structure in this order.

As for a source of the laser beam, for example, a semiconductor laser is used. The preferred wavelength of the laser beam is 390 nm to 410 nm. For example, a GaN-based semiconductor laser, so-called blue-color light-emitting semiconductor laser, is used. The numerical aperture (NA) of the object lens is typically 0.5 to 2.0, and preferably 0.8 to 0.95.

Figure 15:
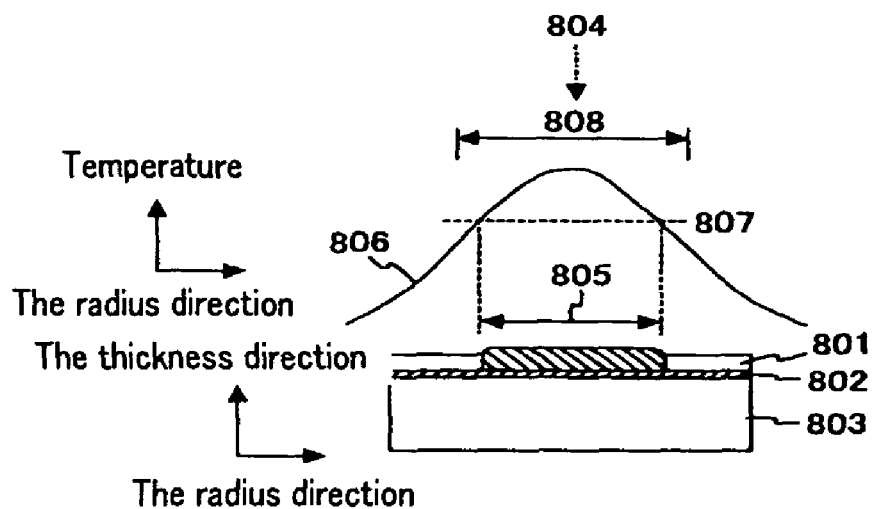
FIG. 15 represents a conventional recording method and shows the state where the optical recording medium is viewed cross-sectionally, and the temperature distribution at the time of recording.
Figure 16:
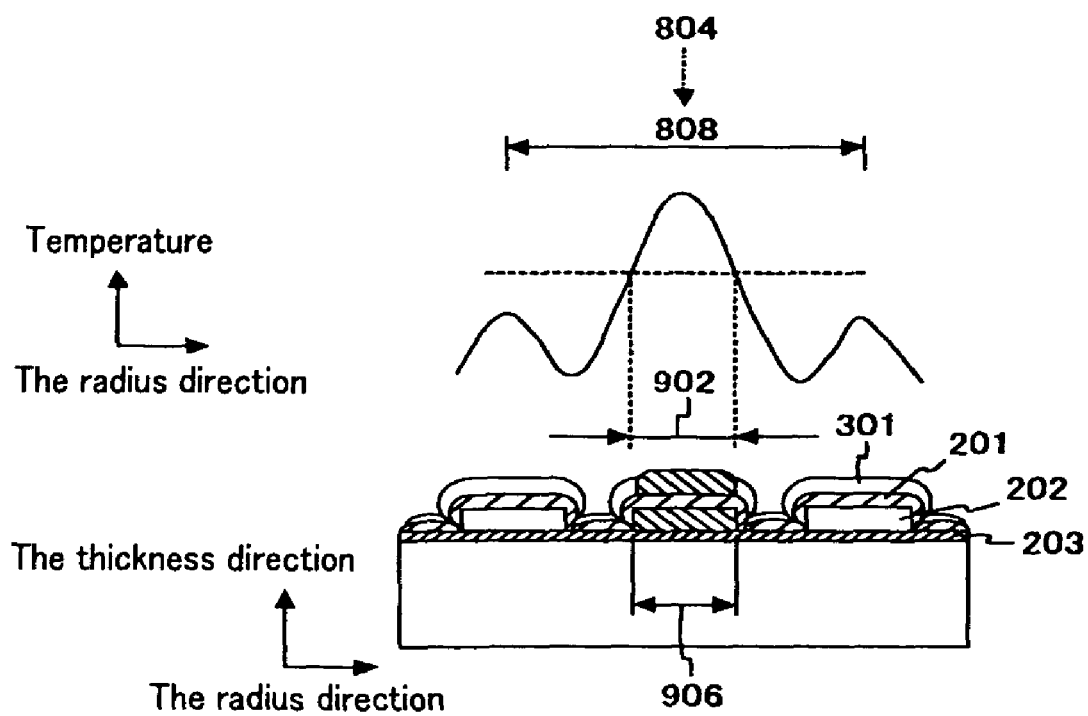
FIG. 16 represents the recording method of the present invention and shows the state where the optical recording medium is viewed cross-sectionally, and the temperature distribution at the time of recording.

FIG. 15 is a view showing a state where information is recorded on a conventional optical recording medium. FIG. 16 is a view showing a state where information is recorded on the optical recording medium of the present invention shown in FIG. 2.

Before the recording method of the present invention is described, the recording method of a conventional optical recording medium will be described below for comparison.

FIG. 15 shows a conventional optical recording medium in which thin layers are formed in a laminar structure. In FIG. 15, the reference numeral 801 represents a recording part, 802 represents a light absorbing and heat generating part, 803 represents a substrate, 804 indicates the direction of laser beam irradiation, and 805 represents a recording mark. The arrow indicates the size of the recording mark in the radius direction of the optical recording medium, which will be hereinafter referred to as "recording mark width".

The reference numeral 806 represents the temperature distribution of the light absorbing and heat generating part 802 in the radius direction of the optical recording medium at the time of irradiation of the laser beam. The reference numeral 807 represents the recording temperature, and 808 represents the laser beam diameter.

The temperature distribution 806 reflects to the distribution of the intensity of the laser beam to form a Gaussian distribution.

The portion in the recording part of which the temperature is increased to the recording temperature 807 or more is changed to form a recording mark. Since the temperature distribution of the light absorbing and heat generating part 802 in the radius direction of the optical recording medium follows the distribution of the intensity of the laser beam as described above, the recording mark width 805 is uniquely determined, and the recording mark width cannot be extremely narrowed with respect to the beam diameter. For the reason, on conventional optical recording media, recording marks are widened in the radius direction of the optical recording medium. Typically, in order to avoid overlapping of recording marks or cross-write, a margin is given to the track pitch, however, the track pitch cannot be reduced to the recording mark length 805 or less.

In contrast to the recording using a conventional optical recording medium, hereinafter, the recording method of the present invention will be described.

In FIG. 16, the reference numeral 301 represents a recording part, 201 represents a light absorbing and heat generating part, 202 represents a recording part, and 203 represents a light absorbing and heat generating part. Each of the recording parts 202 is formed in a circular shape and is completely separated from each other. The reference numeral 901 represents the direction of the laser beam irradiation, 902 represents a recording mark. The arrow indicates the recording mark width. The reference numeral 903 represents the temperature distribution of the light absorbing and heat generating part in the radius direction of the optical recording medium at the time of laser beam irradiation. The reference numeral 904 represents the recording temperature, 905 represents the laser beam diameter, 906 represents the diameter of the recording part 902. Each of the recording parts 301 and each of the light absorbing and heat generating parts 202 are disposed on each of the recording parts 202 formed in a circular shape. Because the coverage of individual materials is reduced at the edges of the recording parts, the individual materials used for the recording parts seem to be separated in the radius direction of the optical recording medium. With the structure in which the light absorbing and heat generating parts 201 are completely separated each other, thermal diffusion in the optical disc surface can be restricted, and the light absorbing and heat generating part positioned at the center of the laser beam diameter is particularly subjected to high-temperature. Recording marks can be formed at only the portions in recording parts heated to the recording temperature 904 or more. The spread of the recording mark width 902 in the radius direction can be restricted to the area surrounded the diameter of the recording part 906 or less. Recording marks are formed only the upper surface and the lower surface. As described above, since the width of a recording mark can be reduced, the track pitch can be set so as to be narrower than that of a conventional optical recording medium shown in FIG. 15.

FIG. 17 is a plan view showing a state where information is recorded using the optical recording medium of the present invention. In FIG. 17, only recording parts 1001 and 1002 are shown. The reference numeral 1001 is a recording part in a recorded state, and 1002 is a recording part in an unrecorded state. The reference numeral 1003 represents the laser beam diameter, 1004 represents the track pitch, 1005 represents the diameter of the recording parts, and 1006 represents the modulation pattern of the laser power. As shown with 1006, the power level of the laser beam is increased on the recording part 1001. As shown in FIG. 16, the portion of the light absorbing and heat generating part positioned at the center of the laser beam diameter is particularly subjected to high-temperature. Although a plurality of recording parts is positioned within area of the beam diameter 1003, only the portion of the recording part 1001 positioned at the center of the laser beam diameter is changed to form a recording mark.

Next, the recording and reproducing method for the optical recording medium of the present invention will be described.

The first aspect of the recording and reproducing method of the present invention is characterized in that the optical recording medium of the present invention is irradiated with a laser beam from the light absorbing and heat generating part side, the power level of the laser beam is increased by use of the period of recording parts in the track direction to thereby record information on the optical recording medium, and the power level of the laser beam is increased by use of the period of the recording parts in the track direction to thereby detect signals of the information.

In this case, the optical recording medium is preferably provided with a substrate, recording parts, and light absorbing and heat generating parts formed in a laminar structure.

The recording method of the present invention is as shown in FIG. 16, and the recorded state is as shown in FIG. 17. Hereinafter, the reproducing method of the present invention will be described.

Figure 18:
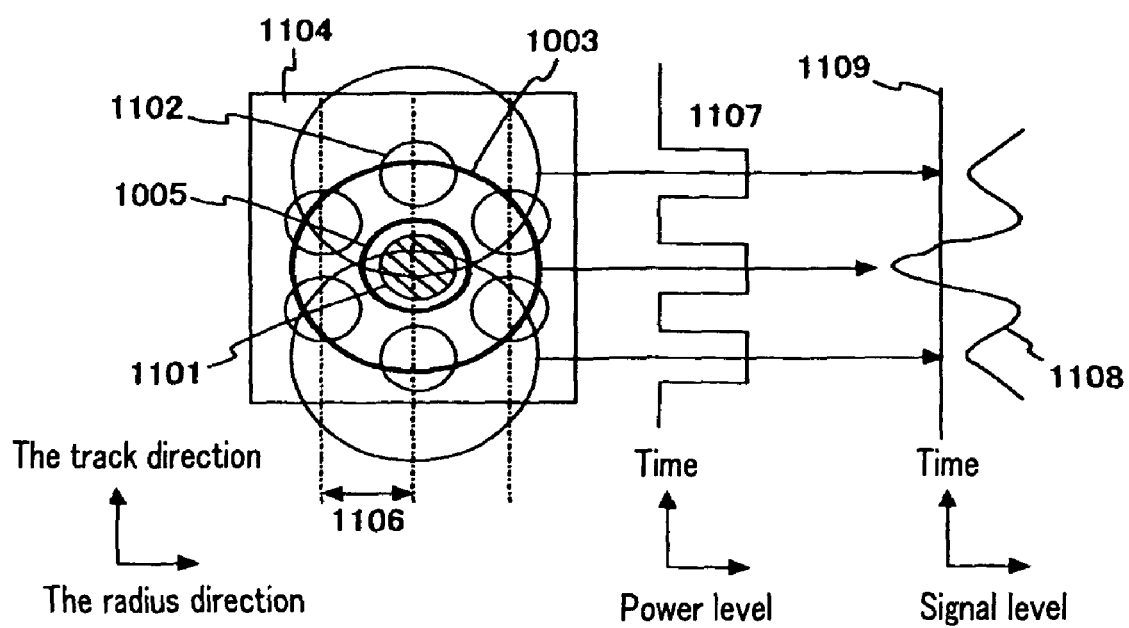
FIG. 18 is a plan view showing the reproducing method of the present invention and the state where information is reproduced on the optical recording medium.

FIG. 18 is a plan view showing the reproducing method for the optical recording medium of the present invention. In FIG. 18, only recording parts 1101 and 1102 and a light absorbing and heat generating part are shown. The recording part 1101 is a recording part in a recorded state (recording mark). The recording part 1102 is a recording part in an unrecorded state. The reference numeral 1103 represents the laser beam diameter, 1104 represents a light absorbing and heat generating part disposed on the recording parts, 1105 represents a changed portion of the light absorbing and heat generating part 1104, and 1107 represents the modulation pattern of the laser power level. The reference numeral 1108 represents changes in signal level that the laser beam detects by use of the period of the recording part while moving to the track direction. The reference numeral 1109 represents the threshold provided to detect changes in signal level. As shown with the reference numeral 1107, the reproducing power level is increased in accordance with the period of the recording part 1001. In this case, similarly to the recording method shown in FIG. 16, the recorded portion of the recording part is particularly subjected to high-temperature. The optical property of the changed portion 1105 of the light absorbing and heat generating part is changed due to the raised temperature. The transmittance or reflectance of the recording part is changed due to the changed optical property.

The laser beam is applied to adjacent recording parts, however, the reflectance or transmittance is changed only in the vicinity of the portion of the recording part positioned at the center of the laser beam diameter, and thus leak of signals from the adjacent recording parts i.e. cross-talk events can be reduced. The reference numeral 1108 represents changes in signal level. Periodic signals from a recording part with a resolution-limited recording period or less can be observed owing to the ability of reducing cross-talk events. The signal level of the recording part 1101 in a recorded state differs from that of the recording part 1102 in an unrecorded state. By setting the threshold 1109 and judging the signal level, a recorded state of a recording part i.e. a state of recording is judged.

The second aspect of the recording and reproducing method of the present is characterized in that the optical recording medium of the present invention is irradiated with a laser beam from the light absorbing and heat generating part side, the power level of the laser beam is increased by use of the period of recording parts in the track direction to thereby record information on the optical recording medium, and signals of the information are detected by use of the period of the recording parts in the track direction.

In this case, the optical recording medium is preferably provided with a substrate, recording parts, and light absorbing and heat generating parts formed in a laminar structure in this order.

The recording method of the present invention is the same as the above noted recording method. The recording method is as shown in FIG. 16, and the recorded state is as shown in FIG. 17. The reproducing method of the present invention will be described below.

In the recording and reproducing method of the present invention, the optical recording medium of the present invention is irradiated with a laser beam from the light absorbing and heat generating part side, information is recorded by increasing the power level of the laser beam by use of the period of the recording parts in the track direction, and signals of the information are detected by use of the period of the recording parts in the track direction.

Specifically, as shown in FIG. 19B, a plurality of recording parts are positioned within laser beam diameter 1210. The recording parts are arranged in a trigonal arrangement (a close-packed trigonal arrangement). The signal level is detected by use of the period of the recording parts in the track direction. The level of the reflected light on a recording part in a recorded state or a recording mark positioned within the area of the beam diameter differs from that of a recording part in unrecorded recording parts. The signal level varies depending on the position of the recording part in a recorded state within the beam diameter. FIG. 20 shows the appearance.

FIG. 20 shows the relation between the arrangement of recording parts in a recorded state and the signal level. This shows variations in signal level when signals are detected by use of the period of the recording parts in the track direction. The reference numeral 130 represents the beam diameter, 131 represents a recording part in a recorded state, 132 represents a recording part in an unrecorded state. The reference numeral 1301 represents an appearance of which all the recording parts within the beam diameter are in an unrecorded state. The reference numeral 1314 represents an appearance of which all the recording parts within the beam diameter are in a recorded state. The reference numeral 1302 represents an appearance of which one of the recording parts other than the recording part positioned at the center of the beam diameter within the beam diameter is in a recorded state. In this case, a plurality of combinations occurs, however, the same signal level is induced in any of the plurality of combinations. The reference numeral 1303 represents an appearance of which two of the recording parts other than the recording part positioned at the center of the beam diameter within the beam diameter are in a recorded state. In this case, a plurality of combinations occurs again, however, the same signal level is induced in any of the plurality of combinations.

The reference numeral 1304 represents an appearance of which a recording part positioned at the center of the beam diameter is in a recorded state. This shows one of the recording parts is in a recorded part, however, the signal level of the recording part differs from the signal level shown in 1302 because the signal intensity of the laser beam forming a Gaussian distribution is intensive. As mentioned above, the signal level for reproducing information varies depending on the position of recording parts in a recorded state and the number of the recording parts.

As shown in FIG. 19B, by arranging the recording parts in a trigonal arrangement to equalize the intervals between the recording part positioned at the center of the beam diameter and all the recording parts having close contact with the recording part, for example, the recording part 1212, one signal can be taken for a plurality of arrangements. Consequently, the number of signal levels which vary depending on a recorded or unrecorded state and the recorded position can be reduced. Degradation of S/N ratio (ratio of signal to noise) can be reduced owing to the reduced number of signal levels. Consequently, signal level can be easily judged, and it is possible to detect the change in signal level by means of the period of the recording part to thereby judge the arrangement of the recording parts in a recorded state i.e. the recorded information.

The most preferable arrangement of recording parts and the most preferable recording and reproducing method are as described above. The most preferable structure of the optical recording medium of the present invention is as shown in FIG. 2. In FIG. 2, the wavelength of the recoding and reproducing beam is 405 nm, and the numerical aperture of the object lens is 0.85. In FIG. 19B, the track pitch 1213 is 120 nm, the diameter of the recording part 1214 is 100 nm, the period of the recording part 1215 in the track direction is 140 nm. In FIG. 20, combinations of recording parts in a recorded state and recording parts in an unrecorded state which are as shown with 1301 to 1314 arise. In this case, the signal level varies at 14 stages.

According to the present invention, it is possible to provide a recordable optical recording medium capable of preventing cross-write and cross-erase events and more drastically reducing the track pitch width than those of conventional optical recording media.

EXAMPLES

Hereinafter, the present invention will be further described in detail referring to specific examples, however, the present invention is not limited to the disclosed examples.

Example 1 and Comparative Example 1

Preparation of Linear-Shaped Recording Part

Figure 8A:
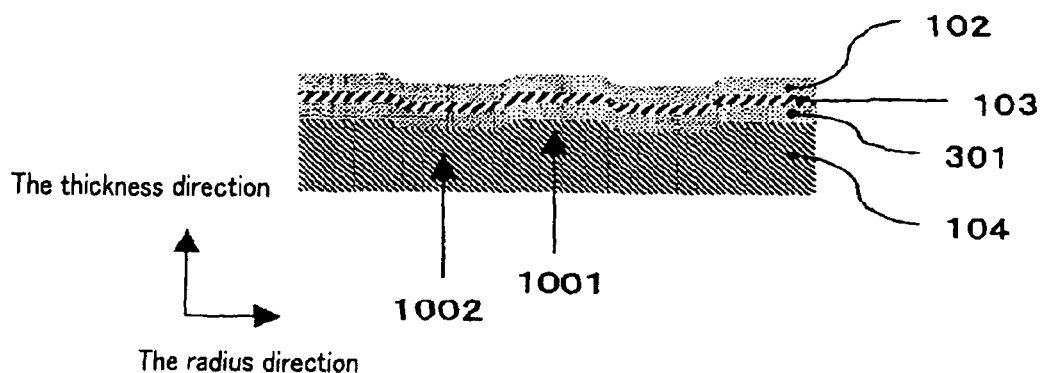
FIG. 8A is a cross-sectional view of the optical recording medium produced in Example 1 before the recording parts thereof were processed in a linear form.
Figure 8B:
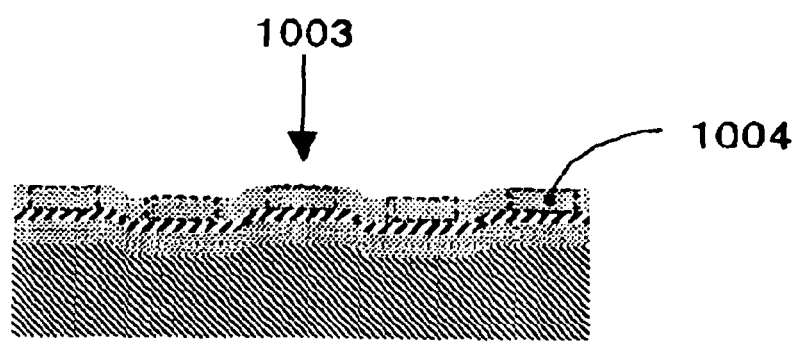
FIG. 8B is a cross-sectional view showing the laser beam irradiation step in Example 1.
Figure 8C:
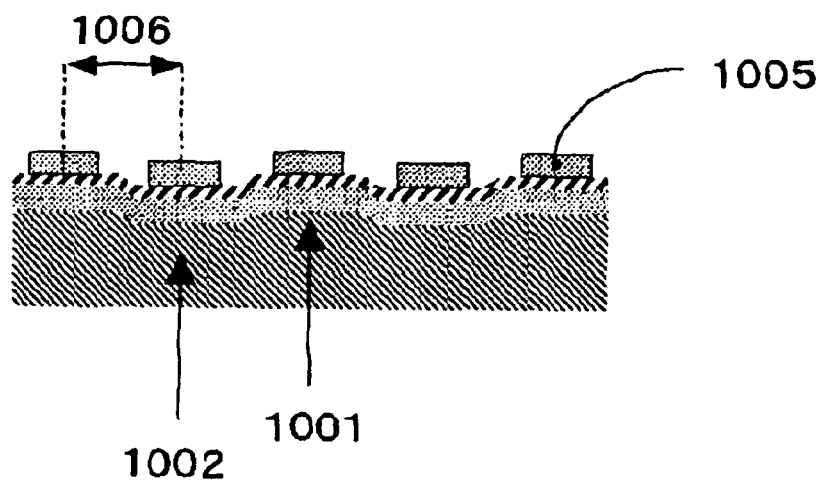
FIG. 8C is a cross-sectional view showing the etching step in Example 1.

FIGS. 8A to 8C respectively show a method for producing recording parts of an optical recording medium of the present invention, which are produced in accordance with the following examples.

FIG. 8A is a view showing a structure of an optical recording medium before the recording parts were processed in a linear form. The recording part 102 was made of $ZnS$—$SiO_2$. For the composition ratio of the material, the material contained $ZnS$ at 80 mole % and $SiO_2$ at 20 mole %. The thickness of the recording parts 102 was 45 nm.

Light absorbing and heat generating part 103 was made of Ge, and the thickness thereof was 10 nm. Thermal conduction-suppressing layer 301 was made of ZnS—SiO$_2$. For the composition ratio of the material, the material contained ZnS at 80 mole % and SiO$_2$ at 20 mole %. The thickness of the thermal conduction-suppressing layer 301 was 50 nm.

Substrate 104 was made of polycarbonate and had a thickness of 0.6 mm and a diameter of 12 cm and was formed in a so-called CD size. On the substrate 104, grooves for tracking were formed. The reference numeral 1001 represents convex portions, and 1002 represents concave portions.

FIG. 8B is a view showing a laser beam irradiation step. A laser beam is applied to the portions to be left as recording parts. Namely, the laser beam is applied in accordance with the shape of the convex portions and the concave portions to change recording parts formed on the convex portions and the concave portions. The reference numeral 1003 represents the direction of the laser beam irradiation. For the source of the laser beam, a semiconductor laser having a wavelength of 405 nm was used. The numerical aperture of the object lens was 0.85. The convex portions 1001 and the concave portions 1002 were irradiated with the laser beam under an irradiation condition of 1.8 mW (CW) while tracking the convex portions 1001 and the concave portions 1002. The portion of the recording part 102 to which the laser beam was applied was densified, and the reference numeral 1004 represents the densified portion.

FIG. 8C is a view showing an etching step, in which the recording part was processed in a linear form. Wet etching method was employed for the etching. A fluoride aqueous solution (HF:H$_2$O=1:10) was used for the etching solution. By soaking the recording part in the fluoride aqueous solution, it is possible to remove the portions to which the laser beam is not applied to thereby process the recording part in a linear form. The reference numeral 1005 represents recording parts processed in a linear form. The reference numeral 1006 represents the track pitch of the recording part. FIG. 8C shows that groove guides or concave and convex portions are formed on the substrate, and the recording parts formed in a linear shape exist on each of the concave and convex portions.

Figure 9:
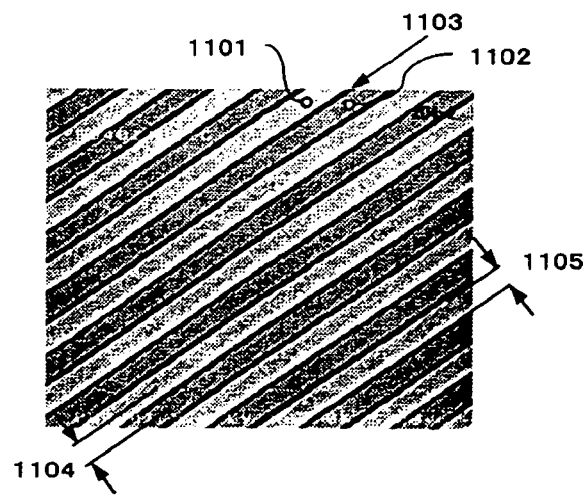
FIG. 9 is a scanning electron microscopic image showing the state where the recording parts of the optical recording medium produced in Example 1 were processed in a linear form.

FIG. 9 shows an image of the surface of the recording part processed in a linear form observed by use of a scanning electron microscope (SEM). In the image, the material ZnS—SiO$_2$ of the recording parts processed in a linear form is observed in white contrast. The reference numeral 1101 represents ZnS—SiO$_2$ on a convex portion, and the reference numeral 1102 represents ZnS—SiO$_2$ on a concave portion. The reference numeral 1103 represents separated portions or spaces. Track pitch 1104 was 220 nm, and the width of each of the recording parts 1105 was 180 nm. The wavelength λ of the laser beam used for recording and reproducing was 405 nm, and the numerical aperture NA of the object lens was 0.85. The track pitch λ/2NA was 238 nm or less, and the width of each of the recording parts had a value of the track pitch multiplied by 0.8. Based on these conditions, when the wavelength of the recording beam and the reproducing beam is represented by λ, and the numerical aperture of the object lens is represented by NA, it is found that it was possible to process the recording parts in a layout satisfying the conditions where the track pitch being the period of the separated recording parts in the radius direction of the optical recording medium had a value of λ/2NA or less, and the width of the separated recording parts was 0.6 times to 0.9 times the track pitch.

Figure 10:
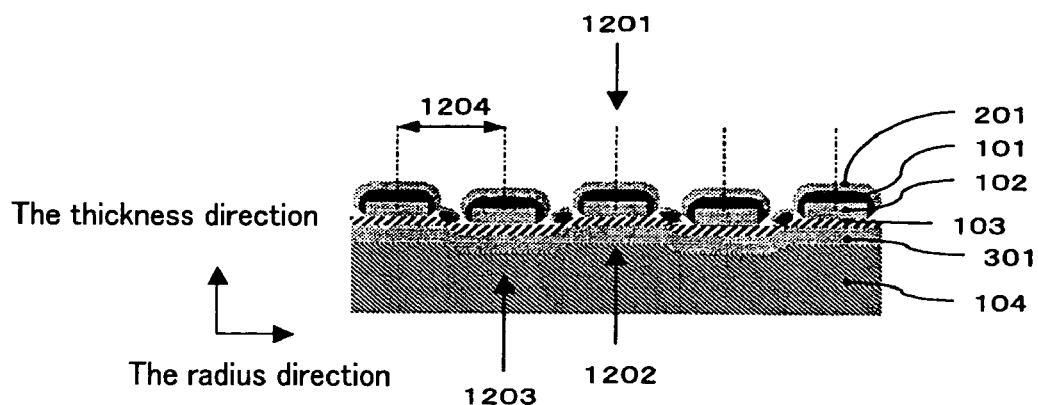
FIG. 10 is a cross-sectional view schematically showing the optical recording medium produced in Example 1.

Next, FIG. 10 shows an optical recording medium having a structure of which light absorbing and heat generating parts 101 and recording parts 201 are formed in a laminar structure on each of the recording parts 1005 processed in a linear shape shown in FIG. 8C. In FIG. 10, the reference numeral 102 represents a recording part which is separately provided in a linear form, 101 represents a light absorbing and heat generating part disposed on the recording part 102, and 201 represents a recording part disposed on the light absorbing and heat generating part 101. As shown in FIG. 10, the recording part 102 separately provided in a linear form has steep edges. In other words, the edges of the recording part 102 are formed in a perpendicular direction or in an inverse tapered shape. Because the edges of the recording part 102 are formed in a steep form, a thin layer is hardly deposited on both sidewalls of the recording part 102. The thickness of the light absorbing and heat generating part 101, and the thickness of the recording part 201 formed in a laminar structure on the recording part 102 are respectively reduced at both sidewalls of the recording part 102. Thus, the light absorbing and heat generating parts 101 and the recording parts 201 are respectively formed in a separated form for each of the recording parts 102, without necessity of subjecting them to an etching treatment.

The recording part 201 was made of ZnS—SiO$_2$—Ag. For the composition ratio of the material, the material contained ZnS at 70 mole %, SiO$_2$ at 20 mole %, and Ag at 10 mole %. The thickness of the recording part 201 was 45 nm.

The light absorbing and heat generating part 101 was made of AgInSbTe. For the composition ratio of the material, the material contained Ag at 4 atomic %, In at 7 atomic %, Sb at 61 atomic %, and Te at 28 atomic %. The thickness of the light absorbing and heat generating part 101 was 20 nm. The track pitch 1204 was 220 nm.

Figure 11:
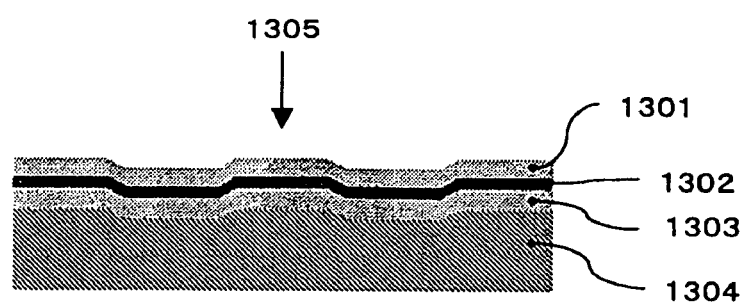
FIG. 11 is a cross-sectional view of the conventional optical recording medium produced in Comparative Example 1.

FIG. 11 shows a structure of an optical recording medium produced in Comparative Example 1.

The reference numeral 1301 represents a recording part. The recording part was made of ZnS—SiO$_2$—Ag. For the composition ratio of the material, the material contained ZnS at 70 mole %, SiO$_2$ at 20 mole %, and Ag at 10 mole %. The thickness of the recording part 1301 was 45 nm.

The reference numeral 1302 represents a light absorbing and heat generating part. The light absorbing and heat generating part was made of AgInSbTe. For the composition ratio of the material, the material contained Ag at 4 atomic %, In at 7 atomic %, Sb at 61 atomic %, and Te at 28 atomic %. The thickness of the light absorbing and heat generating part 1302 was 20 nm.

The reference numeral 1303 represents a recording part. The recording part was made of ZnS—SiO$_2$. For the composition ratio of the material, the material contained ZnS at 80 mole % and SiO$_2$ at 20 mole %. The thickness of the recording part 1303 was 50 nm.

The reference numeral 1304 represents a substrate. The substrate was made of polycarbonate and had a thickness of 0.6 mm. The reference numeral 1305 indicates the direction of the laser beam irradiation.

Figure 12:
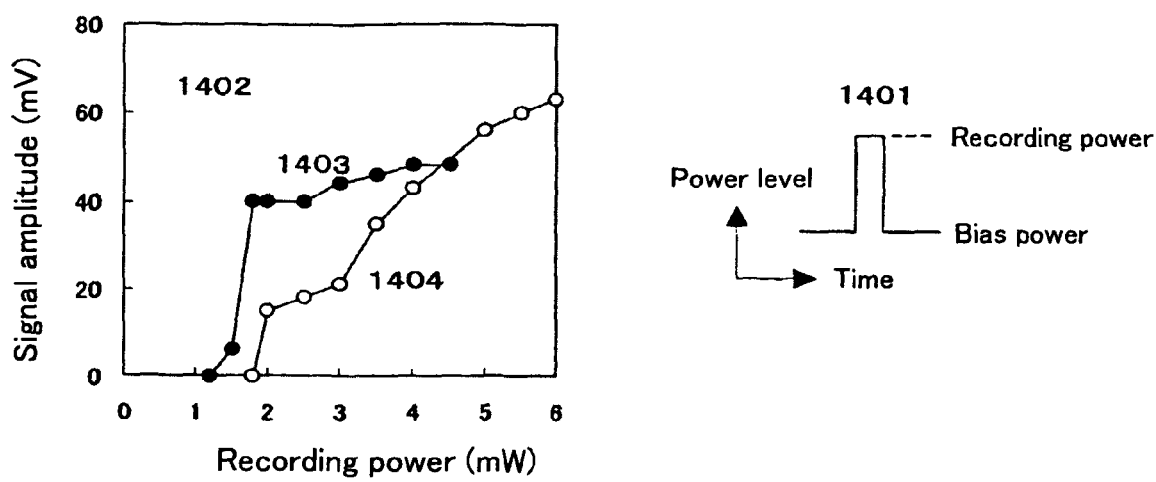
FIG. 12 is a graph showing the recording results using the optical recording media produced in Example 1 and Comparative Example 1 for comparison.

The optical recording medium of Comparative Example 1 in which plural thin layers were formed in a laminar structure was compared to the optical recording medium of Example 1 shown in FIG. 10 by recording information on the respective optical recording media. The wavelength of the laser beam used in the recording was 405 nm, and the numerical aperture of the object lens was 0.85. FIG. 12 shows the comparison results. In FIG. 12, the reference numeral 1401 shown on the right side of the view represents a recording pulse. The laser power was modulated between the recording power level and the bias power level to record information. The recording period was 400 nm. The recording and reproducing linear velocity was 3.5 m/sec. The reproducing power was 0.2 mW. In FIG. 12, the reference numeral 1402 shown on the left side of the view represents changes in signal amplitude with respect to each recording power. The reference numeral 1403 represents recording results of the optical recording medium of Example 1, and 1404 represents recording results of the optical recording medium of Comparative Example 1.

In the recording results 1404 of Comparative Example 1, the recording mark width was widened in the radius direction by increasing the recording power (see the state shown at the upper portion of FIG. 4). Consequently, the signal amplitude increases in accordance with the recording power. In contrast, in the recording results 1403 of Example 1, the recording mark width was not widened (see the state shown in (*b*) of FIG. 5). Consequently, the signal amplitude is maintained virtually constant. In the optical recording medium of Example 1, the thermal diffusion within the surface area of the optical disc is restricted owing to the recording parts each of which is separately provided. In the results, it was possible to obtain a large signal amplitude with a power lower than that in Comparative Example 1. As mentioned above, the effect of suppressing spread of recording marks is verified by the changes in reproducing signals.

In addition, as shown in Example 1, it was possible to reduce the track pitch of the optical recording medium to 220 nm. Namely, when the wavelength of the laser beam is 405 nm, and the numerical aperture of the object lens is 0.85, the track pitch of a conventional optical recording medium is set to 320 nm or more. Compared to this, it is exemplified that the optical recording medium of Example 1 was capable of reducing the track pitch to 70% of that of conventional optical recording media.

Example 2 and Comparative Example 2

Next, spread of a recording mark width was examined and observed by use of a scanning electron microscope (SEM).

FIG. 10 is a view showing a structure of an optical recording medium produced in Example 2. In FIG. 10, the reference numeral 102 shows a recording part separately formed in a linear shape. On the recording part 102, a light absorbing and heat generating part 101 and a recording part 201 are formed in a laminar structure on the recording part 102. As shown in FIG. 10, the recording part 102 separately provided in a linear form has steep edges. In other words, the edges of the recording part 102 are formed in a perpendicular direction or in an inverse tapered shape. Because the edges of the recording part 102 are formed in a steep form, a thin layer is hardly deposited on both sidewalls of the recording part 102. The thickness of the light absorbing and heat generating part 101, and the thickness of the recording part 201 formed in a laminar structure on the recording part 102 are respectively reduced at both sidewalls of the recording part 102. Thus, the light absorbing and heat generating parts 101 and the recording parts 201 are respectively formed in a separated form for each of the recording parts 102, without necessity of subjecting them to an etching treatment. The recording part 201 was made of $ZnS$—$SiO_2$. For the composition ratio of the recording material, the material contained ZnS at 80 mole % and $SiO_2$ at 20 mole %. The recording part 201 had a thickness of 60 nm. The light absorbing and heat generating part 101 was made of AgInSbTe. For the composition ratio of the heat-generating material, the material contained Ag at 4 atomic %, In at 7 atomic %, Sb at 61 atomic %, and Te at 28 atomic %. The light absorbing and heat generating part 101 had a thickness of 20 nm. The track pitch 1204 was 220 nm.

In contrast, FIG. 11 is a view showing a structure of an optical recording medium produced in Comparative Example 2. The reference numeral 1301 represents a recording part. The recording part 1301 was made of $ZnS$—$SiO_2$. For the composition ratio of the material, the material contained ZnS at 80 mole % and $SiO_2$ at 20 mole %. The recording part 1301 had a thickness of 45 nm. The reference numeral 1302 represents a light absorbing and heat generating part. The light absorbing and heat generating part was made of AgInSbTe. For the composition ratio of the material, the material contained Ag at 4 atomic %, In at 7 atomic %, Sb at 61 atomic %, and Te at 28 atomic %. The light absorbing and heat generating part had a thickness of 20 nm. The reference numeral 1303 represents a recording part. The recording part was made of $Zns$—$SiO_2$. For the composition ratio of the material, the material contained ZnS at 80 mole % and $SiO_2$ at 20 atomic %. The recording part 1303 had a thickness of 50 nm. The reference numeral 1304 represents a substrate. The substrate was made of polycarbonate. The substrate had a thickness of 0.6 mm. The reference numeral 1305 indicates the direction of the laser beam irradiation.

Figure 13:
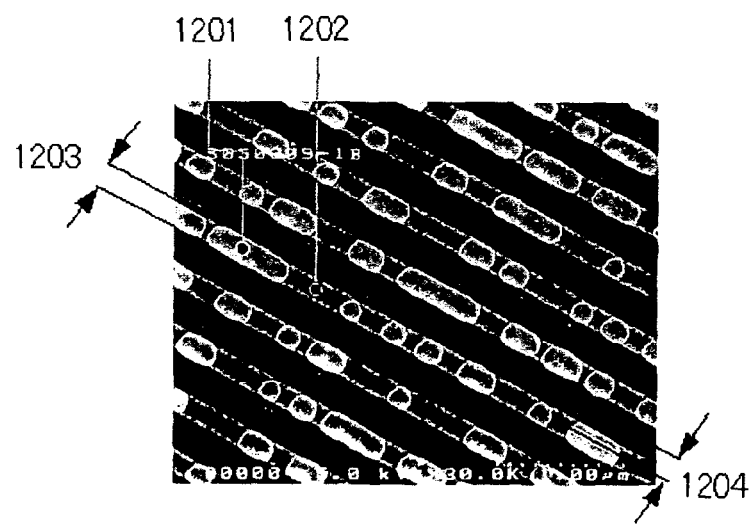
FIG. 13 is a scanning electron microscopic image showing the state where information is recorded on the optical recording medium produced in Example 2.

FIG. 13 is a scanning electron microscopic (SEM) image observed when information was recorded on the optical recording medium of Example 2. The wavelength of the laser beam used for the recording was 405 nm, and the numerical aperture (NA) of the object lens was 0.85. The laser power was modulated between the recording level and the bias level for the recording. The recording power level was 3.5 mW, and the bias power level was 0.4 mW. The reference numeral 1201 observed in white contrast in the SEM image represents recording marks. After recording information on the optical recording medium, the optical recording medium was subjected to an etching treatment to make the recording marks readily observed by use of a scanning electron microscope (SEM). The reference numeral 1202 represents AgInSbTe constituting the light absorbing and heat generating parts 101, 1203 represents the width of recording marks, and 1204 represents the track pitch. The track pitch was 220 nm. As shown in FIG. 13, it is found that spread of the recording mark width was restricted, and recording was enabled without running over the adjacent tracks.

Figure 14:
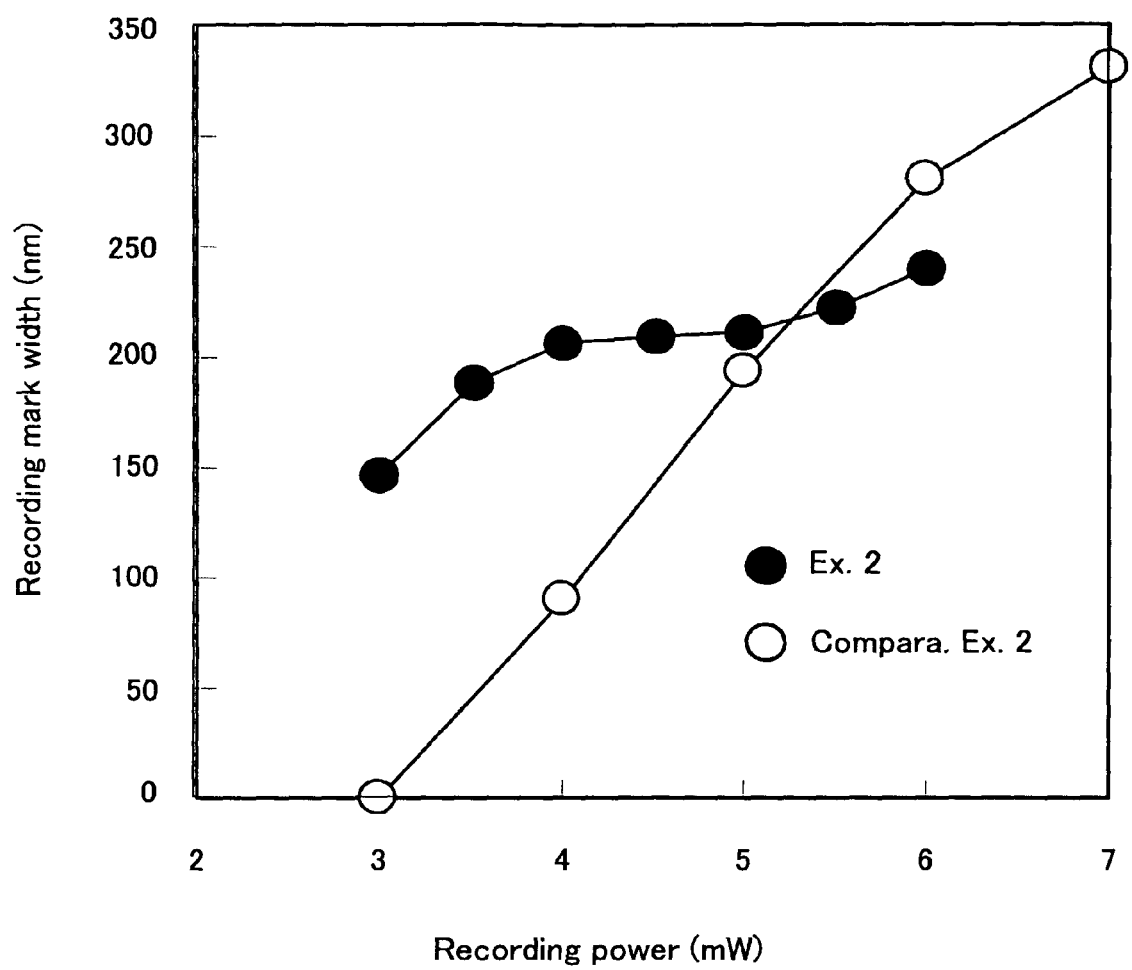
FIG. 14 is a graph showing the results of the recording mark widths of the optical recording media produced in Example 2 and Comparative Example 2 for comparison.

Next, the recorded state of the optical recording medium of Example 2 shown in FIG. 10 was compared in terms of the spread of the recording mark width to the recorded state of the optical recording medium of Comparative Example 2. The wavelength of the laser beam used for recording was 405 nm, and the numerical aperture (NA) of the object lens was 0.85. FIG. 14 shows the recording results. Changes in recording mark width which are represented by 1203 in FIG. 13 for each recording power were compared between the optical recording medium of Example 2 and the optical recording medium of Comparative Example 2. In the optical recording medium of Comparative Example 2, the recording mark width varied in accordance with the recording power, and when the recording power was increased, the recording mark width was widened along with the recording power. In contrast, in the optical recording medium of Example 2, there was a power range in which the recording mark width was not varied even when the recording power was changed. Because it is possible for the optical recording medium of Example 2 to record marks having a certain width regardless of the recording power, the optical recording medium of Example 2 enables preventing cross-write events much more than the optical recording medium of Comparative Example 2. Because of the ability of preventing cross-write events, it is possible to reduce the track pitch by just that much and to increase the recording density. With a structure of a conventional optical recording medium of Comparative Example 2, the reduction limit of the track pitch in the case where recording was performed with a wavelength of the laser beam of 405 nm, and a numerical aperture (NA) of the object lens of 0.85 was nearly 300 nm to 320 nm. It was found that the track pitch can be reduced to 160 nm to 220 nm by making an optical recording medium have the structure of the optical recording medium of Example 2.

The recordable optical recording medium of the present invention can be suitably used as a high-densifying unit for a variety of optical recording media, because the recordable optical recording medium is capable of more drastically preventing cross-write and cross-erase events than conventional optical recording media.

What is claimed is:

1. An optical recording medium comprising:
a substrate
light absorbing and heat generating parts each of which absorbs light and generates heat, and
recording parts,
wherein the light absorbing and heat generating parts are formed in any one of a single layer and a multi-layer and comprise one selected from the group consisting of phase-change materials, semiconductor materials, low-melting point metallic materials, inter-metallic compounds, and oxide materials,
wherein the light absorbing and heat generating parts and the recording parts are formed on or above the substrate, and each of the recording parts is separately formed between two recording tracks, and
wherein when the wavelength of a beam used for recording and reproducing is represented by $\lambda$, and the numerical aperture of the object lens is represented by NA, the track pitch that is a period of the separated recording parts in the radius direction of the optical recording medium has a value of $\lambda/2NA$ or less, and the width of the each of the separated recording parts is 0.6 times to 0.9 times the track pitch.

2. The optical recording medium according to claim 1, wherein the recording parts are periodically formed in the recording track direction in any one of a circular shape and an ellipsoidal shape.

3. The optical recording medium according to claim 1, wherein the recording parts comprise a silicon compound and one selected from the group consisting of sulfide materials, selenide materials, fluoride materials, and nitride materials.

4. The optical recording medium according to claim 1, wherein the recording parts comprise a silicon compound, one selected from the group consisting of sulfide materials, selenide materials, fluoride materials, and nitride materials, and one noble metal material selected from the group consisting of silver, platinum, and palladium.

5. The optical recording medium according to claim 1, wherein the substrate comprises concave portions and convex portions that are guide grooves for a beam used for recording and reproducing, and the each of the recording parts is formed on both the concave portions and the convex portions that are the guide grooves, and the recording parts is separately formed between the one of the concave portions and one of the convex portions.

6. The optical recording medium according to claim 1, wherein the recording parts within the surface area of the optical recording medium are arranged in a close-packed trigonal arrangement.

7. The optical recording medium according to claim 1, wherein the recording parts are individually formed on the substrate, and the each of the light absorbing and heat generating parts is formed on the each of the recording parts.

8. The optical recording medium according to claim 1, wherein the light absorbing and heat generating parts are distinct from the recording parts.

9. The optical recording medium according to claim 1, wherein each of the light absorbing and heat generating parts is separately provided from the recording parts.

10. The optical recording medium according to claim 1, wherein the light absorbing and heat generating parts and the recording parts are separately formed in a radius direction of the optical recording medium.

11. The optical recording medium according to claim 1, wherein the light absorbing and heat generating parts and the recording parts are in separated form.

12. An optical recording method comprising:
irradiating an optical recording medium with a laser beam from the side of light absorbing and heat generating parts,
recording information on the optical recording medium by increasing the power level of the laser beam by use of the period of recording parts in the track direction,
wherein the optical recording medium comprises a substrate, the light absorbing and heat generating parts each of which absorbs light and generates heat, and the recording parts;
the light absorbing and heat generating parts are formed in any one of a single layer and a multi-layer and comprise one selected from the group consisting of phase-change materials, semiconductor materials, low-melting point metallic materials, inter-metallic compounds, and oxide materials;
the light absorbing and heat generating parts and the recording parts are formed on or above the substrate; and
each of the recording parts is separately formed between two recording tracks,
wherein when the wavelength of a beam used for recording and reproducing is represented by $\lambda$, and the numerical aperture of the object lens is represented by NA, the track pitch that is a period of the separated recording parts in the radius direction of the optical recording medium has a value of $\lambda/2NA$ or less, and the width of the each of the separated recording parts is 0.6 times to 0.9 times the track pitch.

13. A recording and reproducing method comprising:
irradiating an optical recording medium with a laser beam from the side of light absorbing and heat generating parts,
recording information on the optical recording medium by increasing the power level of the laser beam by use of the period of recording parts in the track direction, and
detecting signals by increasing the power level of the laser beam by use of the period of the recording parts in the track direction,
wherein the optical recording medium comprises a substrate, the light absorbing and heat generating parts each of which absorbs light and generates heat, and the recording parts;
the light absorbing and heat generating parts are formed in any one of a single layer and a multi-layer and comprise one selected from the group consisting of phase-change materials, semiconductor materials, low-melting point metallic materials, inter-metallic compounds, and oxide materials;
the light absorbing and heat generating parts and the recording parts are formed on or above the substrate; and
each of the recording parts is separately formed between two recording tracks,
wherein when the wavelength of a beam used for recording and reproducing is represented by $\lambda$, and the numerical aperture of the object lens is represented by NA, the track pitch that is a period of the separated recording parts in the radius direction of the optical recording medium has a value of λ/2NA or less, and the width of the each of the separated recording parts is 0.6 times to 0.9 times the track pitch.

14. A recording and reproducing method comprising:
irradiating an optical recording medium with a laser beam from the side of light absorbing and heat generating parts,
recording information on the optical recording medium by increasing the power level of the laser beam by use of the period of recording parts in the track direction, and
detecting signals by use of the period of the recording parts in the track direction,
wherein the optical recording medium comprises a substrate, the light absorbing and heat generating parts each of which absorbs light and generates heat, and the recording parts;
the light absorbing and heat generating parts are formed in any one of a single layer and a multi-layer and comprise one selected from the group consisting of phase-change materials, semiconductor materials, low-melting point metallic materials, inter-metallic compounds, and oxide materials;
the light absorbing and heat generating parts and the recording parts are formed on or above the substrate; and
each of the recording parts is separately formed between two recording tracks,
wherein when the wavelength of a beam used for recording and reproducing is represented by λ, and the numerical aperture of the object lens is represented by NA, the track pitch that is a period of the separated recording parts in the radius direction of the optical recording medium has a value of λ/2NA or less, and the width of the each of the separated recording parts is 0.6 times to 0.9 times the track pitch.

* * * * *